United States Patent
Murakami et al.

(10) Patent No.: US 9,883,427 B2
(45) Date of Patent: Jan. 30, 2018

(54) WIRELESS COMMUNICATION SYSTEM AND WIRELESS COMMUNICATION METHOD

(71) Applicant: FUJITSU LIMITED, Kawasaki-shi, Kanagawa (JP)

(72) Inventors: Yuya Murakami, Yokohama (JP); Kazunari Kobayashi, Yokohama (JP); Katsuyuki Masuda, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 107 days.

(21) Appl. No.: 14/919,538

(22) Filed: Oct. 21, 2015

(65) Prior Publication Data

US 2016/0183138 A1  Jun. 23, 2016

(30) Foreign Application Priority Data

Dec. 19, 2014 (JP) ................................. 2014-257196

(51) Int. Cl.
H04W 4/00 (2009.01)
H04W 36/00 (2009.01)
H04W 36/22 (2009.01)

(52) U.S. Cl.
CPC ........ *H04W 36/0061* (2013.01); *H04W 36/22* (2013.01)

(58) Field of Classification Search
None
See application file for complete search history.

(56) References Cited

U.S. PATENT DOCUMENTS

| | | | |
|---|---|---|---|
| 2007/0091864 A1 | 4/2007 | Honjo et al. | |
| 2008/0004020 A1 | 1/2008 | Yasuda | |
| 2008/0261597 A1 | 10/2008 | Hayama et al. | |
| 2009/0196254 A1* | 8/2009 | Cha | H04W 36/30 370/331 |
| 2010/0069064 A1* | 3/2010 | Hannu | H04W 72/005 455/434 |
| 2012/0282979 A1* | 11/2012 | Ashraf | H04W 16/08 455/561 |
| 2014/0094180 A1* | 4/2014 | Zhou | H04W 40/30 455/445 |

FOREIGN PATENT DOCUMENTS

| | | |
|---|---|---|
| JP | 2007-110373 A | 4/2007 |
| JP | 2007-134993 A | 5/2007 |
| JP | 2008-270990 A | 11/2008 |

* cited by examiner

*Primary Examiner* — Minh-Trang Nguyen
(74) *Attorney, Agent, or Firm* — Arent Fox LLP

(57) ABSTRACT

A wireless communication system includes a first base station device, and a first wireless terminal device, the first base station device acquires identification information of a plurality of base station devices including the first base station device, acquires communication load of each of the plurality of base station devices, transmits the communication load and the identification information of each of the plurality of base station devices to the first wireless terminal device, and changes a serving base station device of the first wireless terminal device to a second base station device and which the first base station device is notified of by the first wireless terminal device, and the first wireless terminal device notifies the first base station device of the identification information of the second base station device selected based on the communication load from the plurality of base station devices.

20 Claims, 22 Drawing Sheets

FIG. 3

| Cell PCI | SIGNAL STRENGTH(dbm) |
|---|---|
| AAA | X |
| BBB | Y |
| CCC | Z |

| CRITERION FOR MEASURED SIGNAL STRENGTH | DETERMINATION RESULT |
|---|---|
| SERVING CELL SIGNAL STRENGTH - NEIGHBORING CELL SIGNAL STRENGTH≤15dbm | BS SELECTABLE AREA |
| SERVING CELL SIGNAL STRENGTH - NEIGHBORING CELL SIGNAL STRENGTH>15dbm | BS UNSELECTABLE AREA |

FIG. 6

| HANDOVER REQUIREMENT | AREA | DETERMINATION RESULT |
|---|---|---|
| SERVING CELL SIGNAL STRENGTH < HANDOVER THRESHOLD | BS SELECTABLE AREA | NOT EXECUTE HANDOVER |
| SERVING CELL SIGNAL STRENGTH < HANDOVER THRESHOLD | BS UNSELECTABLE AREA | EXECUTE HANDOVER |

FIG. 7A

| Cell PCI | NUMBER OF USERS | DOWNLINK SPACE VOLUME(byte) |
|---|---|---|
| AAA | - | - |
| BBB | - | - |
| CCC | - | - |

FIG. 7B

| Cell PCI | NUMBER OF USERS | DOWNLINK SPACE VOLUME(byte) |
|---|---|---|
| AAA | 100 | 5,000,000,000 |
| BBB | 50 | 1,000,000 |
| CCC | 10 | 5,000,000,000 |

FIG. 8

| Cell PCI | SIGNAL STRENGTH(dBm) | NUMBER OF USERS | DOWNLINK SPACE VOLUME(byte) |
|---|---|---|---|
| AAA | -115 | 100 | 5,000,000,000 |
| BBB | -125 | 50 | 1,000,000 |
| CCC | -130 | 10 | 5,000,000,000 |

SELECTION OF CELL

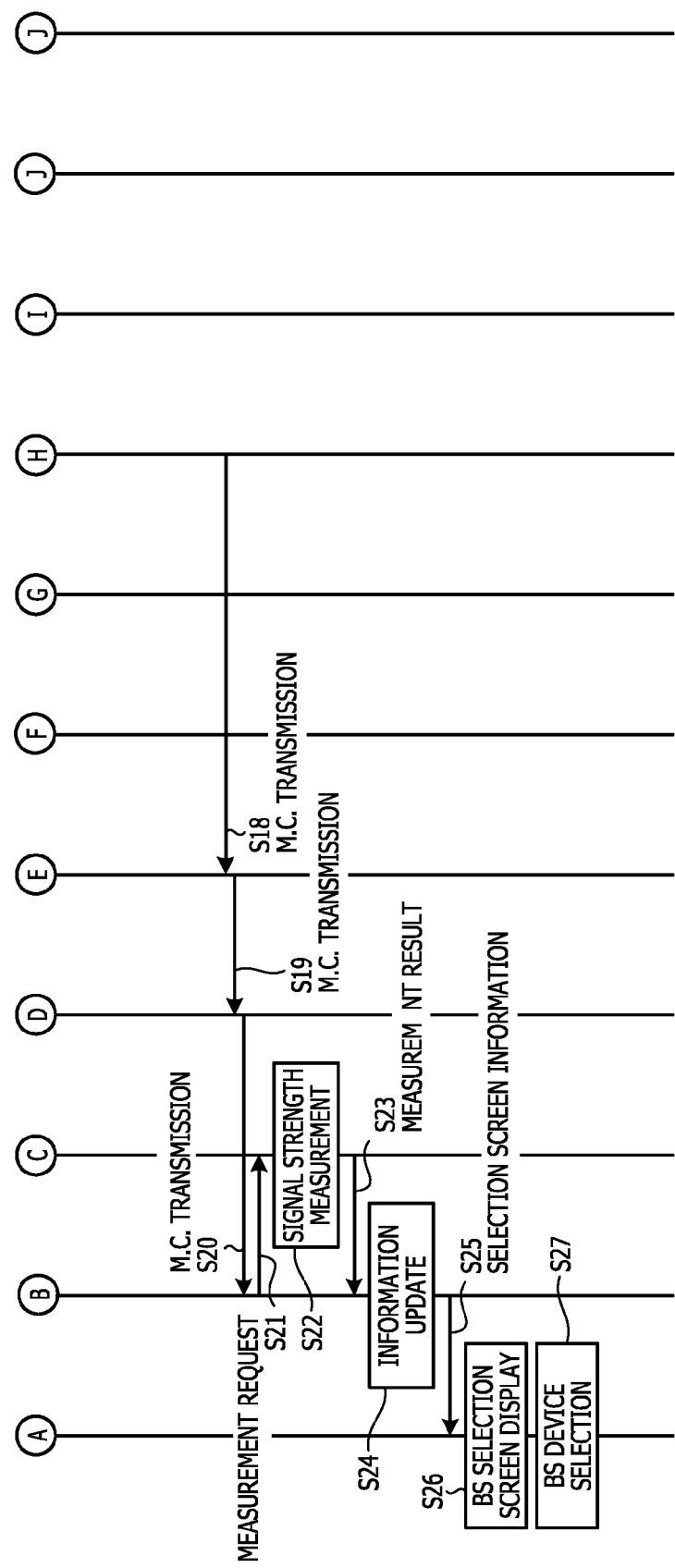

| Cell PCI | NUMBER OF USERS | DOWNLINK DATA VOLUME (byte) | PRIORITY LEVEL |
|---|---|---|---|
| AAA | - | - | - |
| BBB | - | - | - |
| CCC | - | - | - |

| Cell PCI | NUMBER OF USERS | DOWNLINK DATA VOLUME (byte) | PRIORITY LEVEL |
|---|---|---|---|
| AAA | 100 | 5,000,000,000 | 2 |
| BBB | 50 | 1,000,000 | 3 |
| CCC | 10 | 5,000,000,000 | 1 |

FIG. 18

| Cell PCI | SIGNAL STRENGTH (dBm) | NUMBER OF USERS | DOWNLINK SPACE VOLUME (byte) | PRIORITY LEVEL |
|---|---|---|---|---|
| AAA | -115 | 100 | 5,000,000,000 | 2 |
| BBB | -125 | 50 | 1,000,000 | 3 |
| CCC | -130 | 10 | 5,000,000,000 | 1 |
| | | | | SELECTION OF CELL |

WIRELESS COMMUNICATION SYSTEM AND WIRELESS COMMUNICATION METHOD

CROSS-REFERENCE TO RELATED APPLICATION

This application is based upon and claims the benefit of priority of the prior Japanese Patent Application No. 2014-257196, filed on Dec. 19, 2014, the entire contents of which are incorporated herein by reference.

FIELD

The embodiments discussed herein are related to a wireless communication system and a wireless communication method.

BACKGROUND

In recent years, spread of wireless terminals such as smartphones and mobile phones has significantly increased mobile traffic. Under circumstances surrounding telecommunications carriers, such increase in the mobile traffic makes a demand for the ability to support high traffic.

In this regard, telecommunications carriers have placed importance on area coverage and population coverage in competition with other telecommunications carriers. However, as the competition becomes fiercer and fiercer, the telecommunications carriers place more importance on the quality that users feel with information communication services, that is, the quality of experience (QoE) as a point of differentiation from the other carriers. Generally, the QoE for a certain data flow lowers as the time to complete transmission or reception of the data flow increases.

Meanwhile, in conventional wireless communication systems, a wireless terminal selects a wireless base station to be coupled thereto by using criteria based on the radio conditions at the site and a type of radio access technology (RAT). A possible case involving selecting a wireless base station is a case where the wireless terminal is powered on, where handover of the wireless terminal occurs because the wireless terminal moves from an area of a wireless base station to another area. For such a case of wireless base station selection, the conventional wireless communication systems employ a mechanism to select a wireless base station the measured radio conditions of which is better.

In terms of the method of selecting a wireless base station, one of conventional techniques changes a type of information for use in determination in accordance with a type of data to be transferred. Another conventional technique predicts a packet error rate (PER) and uses the predicted PER to predict a throughput for selecting a wireless access point. Still another conventional technique performs handover only when the throughput is expected to increase. The existing technical documents thereof include Japanese Laid-open Patent Publication Nos. 2007-134993, 2007-110373, and 2008-270990.

SUMMARY

According to an aspect of the invention, 1. a wireless communication system includes a first base station device, and a first wireless terminal device, wherein the first base station device includes a first memory, and a first processor coupled to the first memory and configured to acquire identification information of a plurality of base station devices including the first base station device, which are capable of communicating with the first wireless terminal device, acquire communication load of each of the plurality of base station devices, transmit the communication load and the identification information of each of the plurality of base station devices to the first wireless terminal device, and change a serving base station device of the first wireless terminal device to a second base station device which is selected from the plurality of base station devices and which the first base station device is notified of by the first wireless terminal device, and the first wireless terminal device includes a second memory, and a second processor coupled to the second memory and configured to notify the first base station device of the identification information of the second base station device selected based on the communication load from the plurality of base station devices.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a table illustrating an example of measurement results of signal strength of neighboring base station devices;

FIG. 4 is a table illustrating a determination criterion for the BS selectable area;

FIG. 6 is a table illustrating requirements for determining execution of handover;

FIGS. 7A and 7B are tables illustrating examples of a neighboring base station list according to Embodiment 1;

FIG. 8 is a table illustrating an example of a base station selection screen according to Embodiment 1;

FIGS. 9A and 9B are sequence diagrams of a process to provide the base station selection screen in the wireless access system according to Embodiment 1;

FIGS. 17A and 17B are tables illustrating examples of a neighboring base station list according to Embodiment 2;

FIG. 18 is a diagram of an example of a base station selection screen according to Embodiment 2;

DESCRIPTION OF EMBODIMENTS

As the number of users of wireless terminals, such as smartphones, is increasing, the number of wireless terminals managed by each wireless base station is increasing. The increasing number of wireless terminals managed by each wireless base station reduces the data throughput per wireless terminal. In the case where the number of wireless terminals managed by each wireless base station is increased, the data throughput may be therefore lowered even under good radio conditions. In such a case, the QoE may degrade. If the target wireless base station is selected based on the radio conditions as in the conventional way, it is likely to select a wireless base station with a bad QoE.

Even if the conventional technique to change the type of information for use in the determination in accordance with the type of data is used, this technique does not consider the QoE, and is less likely to improve the QoE. According to the conventional technique to select a wireless access point by predicting the throughput, it is difficult to reflect the QoE based on actual throughputs in the prediction. Moreover, the conventional technique to perform handover when the throughput is expected to increase is just intended to improve the throughput after the handover and is less likely to improve the QoE.

Hereinafter, with reference to the drawings, a description is given in detail of embodiments of a wireless access system and a method of controlling the wireless access system which are disclosed by the application.

Embodiment 1

Figure 1:
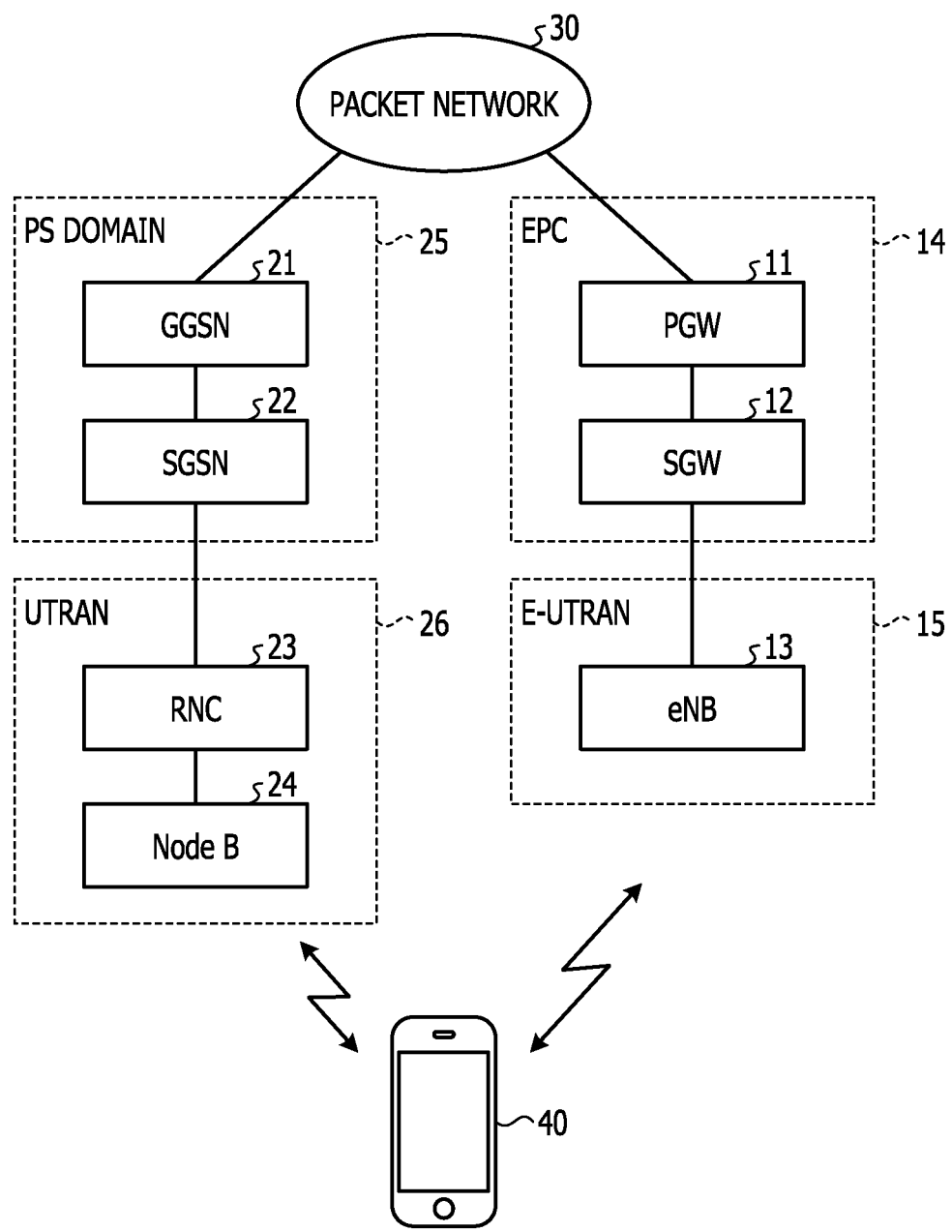
FIG. 1 is a schematic diagram illustrating an example of the entire configuration of a wireless access system.

FIG. 1 is a schematic diagram illustrating an example of the entire configuration of a wireless access system. The wireless access system includes a long term evolution (LTE) network and a 3rd generation (3G) network, for example.

The LTE network includes a packet data network gateway (PDNGW) 11, a serving gateway (SGW) 12, and an evolved node B (eNB) 13, for example. The PGW 11 and SGW 12 constitute an evolved packet core (EPC) 14 as a core network. The eNB 13 constitutes an evolved universal radio access network (E-UTRAN) 15 as a wireless network. User equipment (UE) 40 is a wireless communication terminal. Hereinafter, the person using the UE 40 to utilize the wireless access system is referred to as a user.

The PGW 11 is coupled to a packet data network (PDN) 30 as a packet network. The PGW 11 is a gateway to couple the UE 40 to external networks such as the Internet and company intranets. The SGW 12 is a gateway handling U-plane responsible for transmission of user data packets.

The eNB 13 is a base station device. The eNB 13 exchanges data with the UE 40 through wireless communication. The eNB 13 transmits data received from the UE 40 to the SGW 12. The data received from the UE 40 by the eNB 13 is transmitted to the packet network PDN 30 through the SGW 12 and PGW 11. The data transmitted from the packet network PDN 30 is transmitted to the eNB 13 through the PGW 11 and SGW 12. The eNB 13 transmits the received data to the UE 40.

The 3G network includes a gateway general packet radio service support node (GGSN) 21 and a serving general packet radio service support node (SGSN) 22, for example. The 3G network further includes a radio network controller (RNC) 23 and a Node B 24. The GGSN 21 and SGSN 22 constitute a packet switched (PS) domain 25 providing services based on packet switching. The RNC 23 and Node B 24 constitute a UTRAN 26 as a wireless network.

The GGSN 21 is coupled to the packet network PDN 30. The GGSN 21 is a gateway to couple the UE 40 to external networks such as the Internet and company intranets. The SGSN 22 is a gateway which manages movement of terminals and performs security control in 3G wireless accesses.

The Node B 24 is a wireless base station device that directly couples to user equipment in the 3G communication. The RNC 23 is responsible for governing the Node B 24 for wireless network control. The Node B 24 receives data from the UE 40 through wireless communication and forwards the same to the RNC 23. The RNC 23 transmits the data from the UE 40 to the packet network PDN 30 through the SGSN 22 and GGSN 21. Data from the packet network PDN 30 is transmitted to the RNC 23 through the GGSN 21 and SGSN 22. The RNC 23 transmits the received data to the UE 40 through the Node B 24.

The functions of a base station management device 1 according to Embodiment 1 described below may be installed in the GGSN 21 or SGSN 22 in the 3G network or may be installed in the PGW 11 or SGW 12 in the LTE network, for example. The functions of a base station device 2 according to Embodiment 1 described below may be installed in the RNC 23 in the 3G network or may be installed in the eNB 13 in the LTE network, for example. Moreover, the UE 40 may be equipped with the functions of the wireless terminal device 3 according to Embodiment 1 described below.

Figure 2:
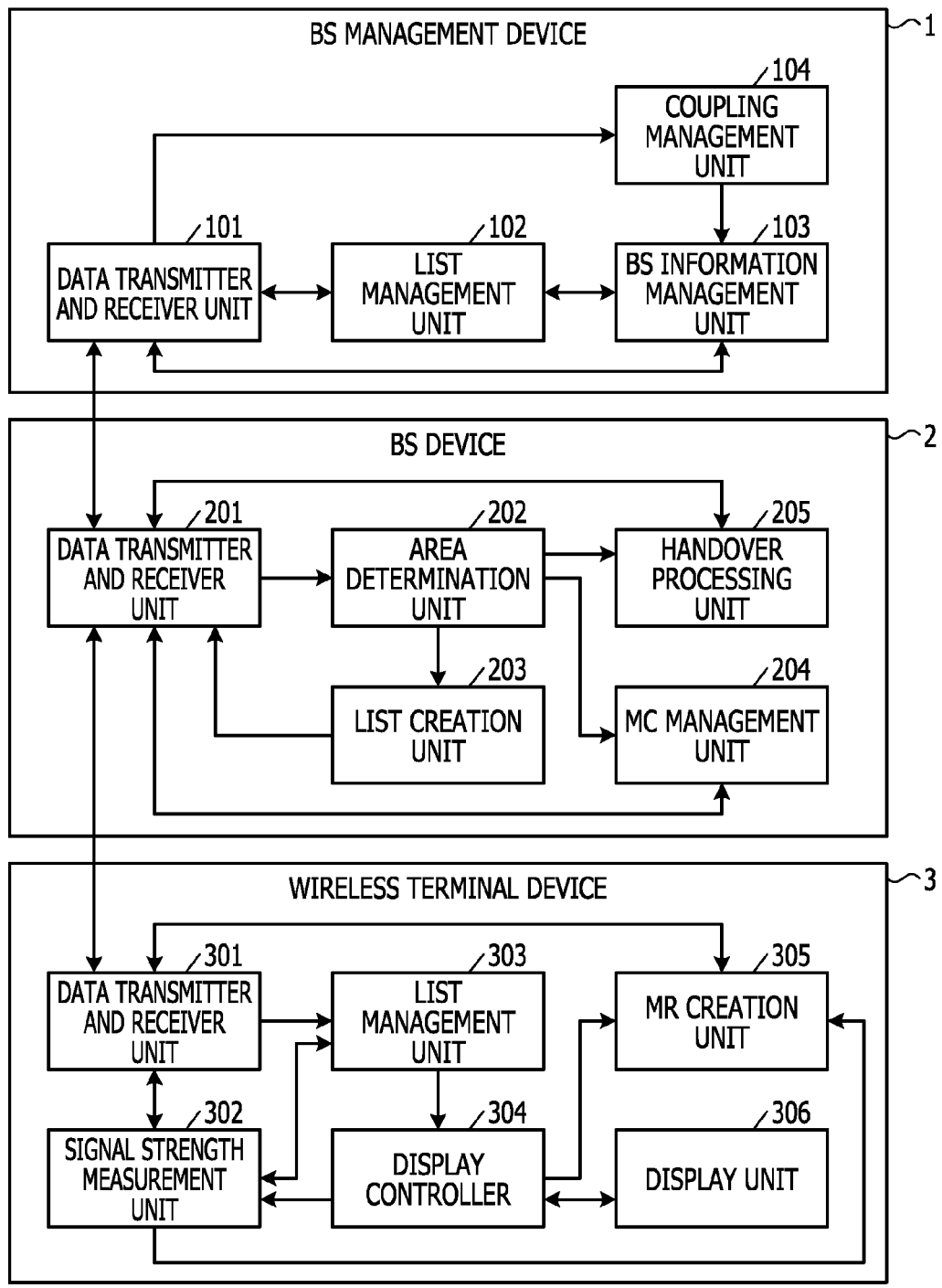
FIG. 2 is a block diagram of the wireless access system according to Embodiment 1.

Next, the base station management device 1, base station device 2, and wireless terminal device 3 according to Embodiment 1 are described with reference to FIG. 2. FIG. 2 is a block diagram of a wireless access system according to Embodiment 1. Hereinafter, a description is given of changing a serving BS device (which is serving the wireless terminal device 3; a serving base station device of the wireless terminal device 3) based on information about the base station device 2. However, the change of the serving BS device may be actually performed based on the information about the cell of the base station device 2 as the information specifying the base station device 2.

The base station device 2 includes a data transmitter and receiver unit 201, an area determination unit 202, a list creation unit 203, a Measurement Control (MC) management unit 204, and a handover processing unit 205. In the description below, the base station device 2 is serving the wireless terminal device 3 or is selected as a target BS device (to which the wireless terminal device 3 is to be handed over). Herein, the cell of the base station device 2 serving the wireless terminal device 3 is referred to as a serving cell.

The data transmitter and receiver unit 201 is coupled to a data transmitter and receiver unit 101 of the base station management device 1 by wire or radio. The data transmitter and receiver unit 201 is coupled to a data transmitter and receiver unit 301 by radio. The data transmitter and receiver unit 201 exchanges data with the data transmitter and receiver units 101 and 301.

The data transmitter and receiver unit 201 receives a communication request from the data transmitter and receiver unit 301 when the wireless terminal device 3 is powered on or the wireless terminal device 3 receives an input of a request to change the serving BS device from the subscriber. Herein, when the wireless terminal device 3 is powered on, the communication request is received by a base station device 2 which is selected as a temporary serving base station device by the wireless terminal device 3. The data transmitter and receiver unit 301 transmits measurement results of signal strength of each of neighboring base station devices to the data transmitter and receiver unit 201 of the selected base station device 2.

The data transmitter and receiver unit 201 establishes a radio resource between the wireless terminal device 3 and base station device 2. The data transmitter and receiver unit 201 then receives the measurement results of signal strength of each neighboring base station device around the wireless terminal device 3 from the data transmitter and receiver unit 301. Herein, the neighboring base station devices are base station devices 2 located in the periphery of the wireless terminal device 3. Specifically, the neighboring base station devices are all the base station devices 2 from which the wireless terminal device 3 is capable of receiving signals. The data transmitter and receiver unit 201 transmits the measurement results of signal strength of the neighboring base station devices to the area determination unit 202.

When the wireless terminal device 3 satisfies handover requirements, the data transmitter and receiver unit 201 receives Measurement Report including the measurement results of signal strength of the neighboring base station devices around the wireless terminal device 3 from the data transmitter and receiver unit 301. The data transmitter and receiver unit 201 transmits the measurement results of signal strength of the neighboring base station devices to the area determination unit 202.

FIG. 3 is a table illustrating an example of the measurement results of signal strength of the neighboring base station devices. The data transmitter and receiver unit 201 may transmit a measurement result table 401 illustrated in FIG. 3 to the area determination unit 202 as a notification of the measurement results of signal strength of the neighboring base station devices. The data transmitter and receiver unit 201 registers a physical cell identifier (Cell PCI) of the cell of each base station device 2 in the measurement result table 401 as the information for identifying the base station device 2. The data transmitter and receiver unit 201 also registers the signal strength in association with each Cell PCI in the measurement result table 401. Hereinafter, the cell of each neighboring base station device 2 is referred to as a neighboring cell. The data transmitter and receiver unit 201 transmits the measurement result table 401 including the aforementioned information to the area determination unit 202.

When it is determined to execute handover of the wireless terminal device 3, the data transmitter and receiver unit 201 receives a notification of execution of handover from the handover processing unit 205. The data transmitter and receiver unit 202 transmits an instruction to execute handover to the data transmitter and receiver unit 301.

On the other hand, in the case of causing the subscriber to select a base station device 2 as the target BS device before executing handover, the data transmitter and receiver unit 201 receives a neighboring base station list from the list creation unit 203. The neighboring base station list is a list of base station devices 2 located in the periphery of the wireless terminal device 3. The neighboring base station list is described in detail later. The data transmitter and receiver unit 201 transmits the neighboring base station list to the data transmitter and receiver unit 101 together with a list update request.

The data transmitter and receiver unit 201 receives the updated neighboring base station list from the data transmitter and receiver unit 101 in response to the list update request. The data transmitter and receiver unit 201 transmits a request to create Measurement Control to the MC management unit 204 together with the updated neighboring base station list.

The data transmitter and receiver unit 201 receives Measurement Control for allowing the subscriber to select a base station device 2 as the target BS device, that is, the Measurement Control including the contents of the updated base station list from the MC management unit 204. The Measurement Control for allowing the subscriber to select a base station device 2 as the target BS device is referred to as Measurement Control for selection. The data transmitter and receiver unit 201 transmits the Measurement Control for selection to the data transmitter and receiver unit 301.

Thereafter, the data transmitter and receiver unit 201 receives information about the base station device 2 selected as the target BS device by the subscriber (hereinafter, referred to as a selected base station device). The data transmitter and receiver 201 transmits the information about the selected base station device to the handover processing unit 205.

In the case of not allowing the subscriber to select a base station device 2 but also not executing handover, the data transmitter and receiver unit 201 receives normal Measurement Control from the MC management unit 204. The normal Measurement Control includes a handover threshold and a candidate list of neighboring base station devices. The data transmitter and receiver unit 201 transmits the Measurement Control to the data transmitter and receiver unit 301. Herein, the normal Measurement Control is a signal to cause the wireless terminal device 3 to transmit Measurement Report when the wireless terminal device 3 just satisfies the handover requirements unlike Measurement Control for selection. Examples of the handover requirements include such a requirement that when the received signal strength is equal to or higher than the transmitted handover threshold, Measurement Report is transmitted.

The area determination unit 202 includes a previously determined area determination threshold. In Embodiment 1, the area determination unit 202 stores 15 dbm as the area determination threshold. It is practically preferable that the area determination threshold is set in accordance with the operation of the wireless access system.

The area determination unit 202 receives the measurement results of signal strength of each neighboring base station device from the data transmitter and receiver unit 201. The area determination unit 202 selects a base station device 2 from the neighboring base station devices and uses the signal strength of the serving cell and the signal strength of the neighboring cell of the selected base station device 2 to determine whether the wireless terminal device 3 is located in a BS selectable area by using requirements 402 illustrated in FIG. 4. FIG. 4 is a table illustrating the criterion for determining the BS selectable area. Herein, the area where plural base station devices 2 are available as the serving BS device of the wireless terminal device 3 is referred to as the BS selectable area.

Figure 5:
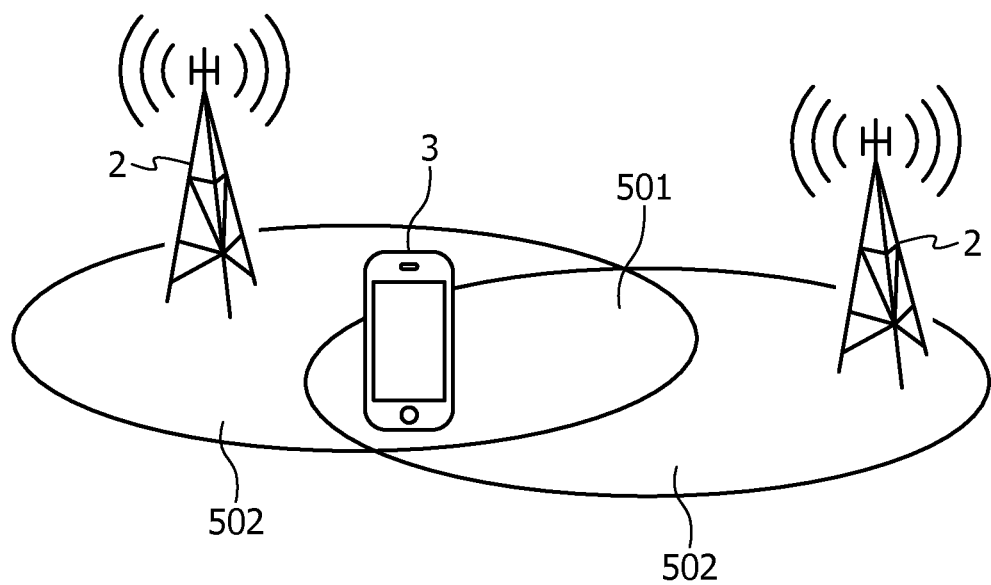
FIG. 5 is a diagram for describing the area where a wireless terminal device is located.

The BS selectable area is described for a case where two base station devices 2 are provided as illustrated in FIG. 5. In this case, there are an area 501 which is an overlap of the two cells and areas 502 each of which is covered with any one of the two cells. FIG. 5 is a diagram for describing the area where the wireless terminal device is located. When the wireless terminal device 3 is located in the area 501, the wireless terminal device 3 can select any one of the two base station devices 2 as the target BS device. The area 501 is therefore the BS selectable area. On the other hand, when the wireless terminal device 3 is located in one of the areas 502, the wireless terminal device 3 can select only the base station device 2 of the area 502, where the wireless terminal device 3 is located, and is unlikely to select the other base station device 2. The area 502 is therefore the BS unselectable area.

The area determination unit 202 calculates the absolute value of the difference in signal strength between the serving cell and the neighboring cell of the selected base station device 2. The area determination unit 202 determines whether the calculated value is more than 15 dbm. If the calculated value is not more than 15 dbm, the area determination unit 202 determines that the wireless terminal device 3 is located in the BS selectable area as described in the requirements 402. When the calculated value is more than 15 dbm, the area determination unit 202 determines that the wireless terminal device 3 is located in the BS unselectable area as described in the requirements 402.

Moreover, the area determination unit 202 stores a handover threshold in advance. The area determination unit 202 determines whether the signal strength of the serving cell is less than the handover threshold. When the signal strength of the serving cell is not less than the handover threshold, the area determination unit 202 performs the following process. Specifically, the area determination unit 202 transmits the neighboring base station information to the list creation unit 203 together with a request to create the neighboring base station list (hereinafter, also referred to as a list creation request) when the wireless terminal device 3 is located in the BS selectable area. On the other hand, the area determination unit 202 transmits a request to create Measurement Control for selection to the MC management unit 204 when the wireless terminal device 3 is located in the BS unselectable area.

When the signal strength of the serving cell is less than the handover threshold, the area determination unit 202 determines whether to execute handover in accordance with requirements 403 illustrated in FIG. 6. FIG. 6 is a table illustrating determination requirements for execution of handover. The area determination unit 202 determines not to execute handover when the wireless terminal device 3 is located in the BS selectable area even if the signal strength of the serving cell is less than the handover threshold. The area determination unit 202 then transmits the neighboring base station information to the list creation unit 203 together with a request to create the neighboring base station list. On the other hand, the area determination unit 202 determines to execute handover when the signal strength of the serving cell is less than the handover threshold and the wireless terminal device 3 is located in the BS unselectable area. Next, the area determination unit 202 specifies a base station device 2 as the handover target based on the measurement results of signal strength of the neighboring base station devices. The area determination unit 202 then notifies the handover processing unit 205 of information about the base station device 2 specified as the handover target.

The list creation unit 203 receives the neighboring base station information from the area determination unit 202 together with a request to create the neighboring base station list. The list creation unit 203 creates a neighboring base station list 404 illustrated in FIG. 7A. The neighboring base station list 404 includes registration fields for the number of users that represents the number of wireless terminal devices 3 served by each base station device and downlink space volume that represents the volume of space in downlink data. FIGS. 7A and 7B are tables illustrating examples of the neighboring base station list according to Embodiment 1. Since the number of users and downlink space volume are both unknown, the list creation unit 203 leaves each registration field blank. The list creation unit 203 transmits the neighboring base station list to the data transmitter and receiver unit 201.

The MC management unit 204 receives the neighboring base station list 405 (illustrated in FIG. 7B) which is updated by the base station management device 1 from the data transmitter and receiver unit 201. The MC management unit 204 creates Measurement Control for selection including the information about the neighboring base station list 405. To be specific, the created Measurement Control for selection includes the number of users and downlink space volume in association with the Cell PCI of each neighboring base station device. The Measurement Control for selection further includes the handover threshold similarly to normal Measurement Control. The MC management unit 204 transmits the Measurement Control for selection to the data transmitter and receiver unit 201.

The MC management unit 204 receives the request to create Measurement Control from the area determination unit 202. The MC management unit 204 then creates normal Measurement Control. The MC management unit 204 transmits the created normal Measurement Control to the transmitter and receiver unit 201.

When the signal strength of the serving cell is less than the handover threshold and the wireless terminal device 3 is not located in the BS selectable area, the handover processing unit 205 receives information about the handover target cell from the area determination unit 202. The handover processing unit 205 notifies the base station device 2 of the handover target cell of information about the handover through the data transmitter and receiver unit 201 and base station management device 1. The handover processing unit 205 instructs the wireless terminal device 3 to be handed over to the handover target cell through the data transmitter and receiver unit 201.

When the wireless terminal device 3 is located in the BS selectable area, the handover processing unit 205 receives from the data transmitter and receiver unit 201, information about the base station device 2 which is selected as the target BS device by the subscriber. The handover processing unit 205 notifies the selected base station device 2 of the handover information through the data transmitter and receiver unit 201 and base station management device 1. The handover processing unit 205 instructs the wireless terminal device 3 through the data transmitter and receiver unit 201 to be handed over to the selected base station device.

The base station management device 1 includes a data transmitter and receiver unit 101, a list management unit 102, a base station information management unit 103, and a coupling management unit 104.

The data transmitter and receiver unit 101 is coupled to the data transmitter and receiver unit 201 of each base station device 2. The data transmitter and receiver unit 101 exchanges data with the data transmitter and receiver unit 201.

The data transmitter and receiver unit 101 acquires information about wireless terminal devices 3 coupled to each base station device 2 and information about the wireless terminal devices 3 decoupled from the base station device 2 from the data transmitter and receiver unit 201 thereof, for example. The data transmitter and receiver unit 101 transmits information about the wireless terminal devices 3 coupled to or decoupled from the base station device 2 to the base station information management unit 103.

The data transmitter and receiver unit 101 transmits data received from another base station device 2 or data which is directed to the wireless terminal device 3 and is received from an external network (not illustrated) to the data transmitter and receiver unit 201. Hereinafter, data directed from the base station device 2 to the wireless terminal device 3 is referred to as downlink data. The data transmitter and receiver unit 101 transmits the data volume of downlink data to the base station information management unit 103.

The data transmitter and receiver unit 101 receives the neighboring base station list 404 illustrated in FIG. 7A from the data transmitter and receiver unit 101 together with a request to update the neighboring base station list 404. The data transmitter and receiver unit 101 transmits the neighboring base station list 404 to the list management unit 102 together with the request to update the neighboring base station list 404.

In response to the request to update the neighboring base station list 404, the data transmitter and receiver unit 101 receives the updated neighboring base station list 405 illustrated in FIG. 7B. The data transmitter and receiver unit 101 transmits the updated neighboring base station list 405 to the data transmitter and receiver unit 201.

The coupling management unit 104 receives a request to authenticate a wireless terminal device 3 from a base station device 2. The coupling management unit 104 performs authentication and notifies the wireless terminal device 3 of whether to couple the wireless terminal device 3 to the base station device 2. When the authentication is successful, the coupling management unit 104 stores information about coupling between the base station device 2 and wireless terminal device 3 in the base station information management unit 103.

The coupling management unit 104 receives from a base station device 2, a request to decouple the wireless terminal device 3. The coupling management unit 104 receives from the base station device 2, information about decoupling of the wireless terminal device 3 from the base station device 2. The coupling management unit 104 notifies the wireless terminal device 3 of whether to decouple the wireless terminal device 3 from the base station device 2. When the decoupling is successful, the coupling management unit 104 notifies the base station information management unit 103 of termination of coupling between the base station device 2 and wireless terminal device 3 by decoupling.

The base station information management unit 103 includes a storage medium such as a hard disk. The base station information management unit 103 receives the data volume of downlink data of each base station device 2 from the transmitter and receiver unit 101. The base station information management unit 103 receives from the coupling management unit 104, information about the wireless terminal devices 3 coupled to the base station device 2 and information about the wireless terminal devices 3 decoupled from the base station device 2. The base station information management unit 103 stores the number of users (the number of wireless terminal devices 3 coupled to each base station device 2) and data volume of downlink data for each base station device 2.

The list management unit 102 receives a request to update the neighboring base station list 404 and the neighboring base station list 404 from the data transmitter and receiver unit 101. When receiving the request to update the neighboring base station list 404, the list management unit 102 acquires from the base station information management unit 103, the number of users and downlink data volume (C) corresponding to each of the Cell PCIs registered in the neighboring base station list 404. Herein, the list management unit 102 stores the maximum downlink data capacity ($C_{max}$) of each base station device 2. The list management unit 102 subtracts the downlink data volume (C) from the maximum downlink data capacity ($C_{max}$) to calculate the downlink space volume.

The list management unit 102 then registers the number of users and downlink space volume corresponding to each Cell PCI in the received neighboring base station list 404 to create the updated neighboring base station list 405 illustrated in FIG. 7B. The list management unit 102 transmits the created neighboring base station list 405 to the data transmitter and receiver unit 101.

The wireless terminal device 3 includes a data transmitter and receiver unit 301, a signal strength measurement unit 302, a list management unit 303, a display controller 304, a Measurement Report (MR) creation unit 305, and a display unit 306.

The data transmitter and receiver unit 301 is coupled to the data transmitter and receiver unit 201 by radio. The data transmitter and receiver unit 301 exchanges data with the data transmitter and receiver unit 201.

When the wireless terminal device 3 is powered on, the data transmitter and receiver unit 301 acquires from the signal strength measurement unit 302, the measurement results of signal strength of each neighboring base station device. The data transmitter and receiver unit 301 selects the base station device 2 with the highest signal strength among the acquired signal strengths of the neighboring base station devices as the temporary serving BS device. The data transmitter and receiver unit 301 transmits the measurement results of signal strength of the neighboring base station devices to the data transmitter and receiver unit 201 of the selected base station device 2.

The data transmitter and receiver unit 301 receives normal Measurement Control from the data transmitter and receiver unit 201. The data transmitter and receiver unit 301 transmits the received normal Measurement Control to the MR creation unit 305. Thereafter, when the handover requirements are satisfied, the data transmitter and receiver unit 301 acquires from the MR creation unit 305, Measurement Report including the measurement results of signal strength of the neighboring base station devices 2. The data transmitter and receiver unit 301 transmits the Measurement Report to the data transmitter and receiver unit 201.

When the subscriber inputs a request to update the neighboring base station list, the data transmitter and receiver unit 301 acquires the measurements of the signal strength of the neighboring base station devices from the signal strength measurement unit 302. The data transmitter and receiver unit 301 transmits the acquired measurement results of signal strength of the neighboring base station devices to the data transmitter and receiver unit 201.

The data transmitter and receiver unit 301 receives Measurement Control for selection from the data transmitter and receiver unit 201. The data transmitter and receiver unit 301 then transmits the Measurement Control for selection to the list management unit 303 together with a request to update the neighboring base station list.

The data transmitter and receiver unit 301 includes a pending timer. The pending timer is configured to measure the time taken for the data transmitter and receiver unit 301 to receive user's selection of the target BS device 2 based on the information of the neighboring base station list included in the Measurement Control for selection. The data transmitter and receiver unit 301 starts counting of the pending timer after transmitting the request to update the neighboring base station list to the list management unit 303. The data transmitter and receiver unit 301 receives the measurement results of signal strength of the neighboring base station devices from the signal strength measurement unit 302 until expiration of the pending timer. The data transmitter and receiver unit 301 transmits the received measurement results of signal strength of the neighboring base station devices to the data transmitter and receiver unit 201. Accordingly, the handover processing by the base station device 2 to change the serving BS device is not executed until the pending timer has expired. This can secure enough time for the subscriber to select the target BS device.

Upon the subscriber's selection of the target BS device, the data transmitter and receiver unit 301 receives Measurement Report specifying the selected base station device 2 as the target BS device from the MR creation unit 305. The data transmitter and receiver unit 301 transmits the Measurement Report specifying the selected base station device 2 as the target BS device to the data transmitter and receiver unit 201.

The signal strength measurement unit 302 acquires radio waves transmitted from the neighboring base station devices to regularly measure the signal strength thereof. The signal strength measurement unit 302 transmits the measurements to the MR creation unit 305.

When Measurement Control for selection is transmitted, the signal strength measurement unit 302 receives a request to measure the signal strength. The signal strength measurement unit 302 then measures the signal strength of the neighboring base station devices and transmits the measurement results of signal strength of the neighboring base station devices to the list management unit 303.

When the subscriber inputs a request to update the neighboring base station list, the signal strength measurement unit 302 receives a request to measure the signal strength from the display controller 304. The signal strength measurement unit 302 measures the signal strength of the neighboring base station devices. Thereafter, the signal strength measurement unit 302 transmits the measurement results of signal strength of the neighboring base station devices to the data transmitter and receiver unit 301.

The list management unit 303 receives Measurement Control for selection from the data transmitter and receiver unit 301 together with a request to update the neighboring base station list. The list management unit 303 extracts the Cell PCIs described in the Measurement Control for selection and the signal strength, number of users, and downlink space volume corresponding to each Cell PCI.

The list management unit 303 then transmits a request to measure the signal strength of the base station device 2 corresponding to each extracted Cell PCI. Thereafter, the list management unit 303 receives the measurement results of signal strength from the signal strength measurement unit 302.

The list management unit 303 then updates the signal strength of each base station device 2 described in the Measurement Control for selection with the measurements received from the signal strength measurement unit 302. The list management unit 303 transmits to the display controller 304, the Cell PCI of each base station device 2 with the signal strength updated and the signal strength, number of users, and downlink space volume corresponding to the Cell PCI.

The display controller 304 receives from the list management unit 303, the Cell PCI of each base station device 2 and the signal strength, number of users, and downlink space volume corresponding to the Cell PCI. The display controller 304 creates a base station selection screen 406 presenting received information in a predetermined format to prompt the subscriber to select the target BS device as illustrated in FIG. 8. FIG. 8 is a diagram of an example of a base station selection screen according to Embodiment 1. The display controller 304 displays the created base station display screen 406 on the display unit 306, such as a monitor.

In the base station display screen 406, by selecting the Cell PCI of the base station device 2 which is intended be the target BS device and pressing a cell selection button, the base station device 2 having the selected Cell PCI is inputted as the target BS device. The user sees the reception quality, number of users, and downlink space volume presented on the base station selection screen 406 to determine the target BS device 2.

Herein, the base station device 2 with higher signal strength provides better communication. As the number of users increases, increasing load may reduce the communication speed. Moreover, the larger the downlink space volume, the wider the available range, and the higher the communication speed may be. Accordingly, when selecting a base station device 2 with higher signal strength, a smaller number of users, and larger downlink space volume, the subscriber obtains a more comfortable communication environment. By selecting a base station device 2 with a smaller number of users and larger downlink space volume in particular, the subscriber couples the wireless terminal device 3 to the base station device 2 having lower communication load, thus improving the QoE.

The display controller 304 acquires information including the Cell PCI of the selected base station device which is the base station device 2 selected by the subscriber as the target BS device. The display controller 304 transmits the information about the selected base station device to the MR creation unit 305.

When receiving from the subscriber, the request to update the neighboring base station list for displaying the base station selection screen based on the new neighboring base station list, the display controller 304 transmits the request to measure the signal strength of the neighboring base station devices to the signal strength measurement unit 302.

The MR creation unit 305 receives the information about the selected base station device from the display controller 304. Next, the MR creation unit 305 creates Measurement Report specifying the notified selected base station device as the target BS device.

To be specific, the MR creation unit 305 modifies the signal strength of the selected base station device 2 to a value higher than the currently highest signal strength among the base station devices 2 so that the selected base station device becomes the target BS device. To be more specific, the MR creation unit 305 modifies the signal strength of the selected base station device 2 so that the signal strength of the selected base station device 2 is the area determination threshold higher than the signal strength of the base station device 2 currently having the highest signal strength. For example, when the area determination threshold is 15 dbm, the MR creation unit 305 replaces the signal strength of the selected base station device with the value obtained by adding 16 dbm to the signal strength of the base station device 2 currently having the highest signal strength. The MR creation unit 305 then creates Measurement Report including the modified signal strength of the neighboring base station device so that Measurement Report specifies the notified selected base station device 2 as the target BS device. At execution of handover based on the transmitted Measurement Report, the base station device 2 therefore determines that the wireless terminal device 3 is located in the BS unselectable area, and the wireless terminal device 3 is certainly handed over to the selected base station device 2.

The MR creation unit 305 then transmits the created Measurement Report to the data transmitter and receiver unit 301.

The MR creation unit 305 receives the normal Measurement Control from the data transmitter and receiver unit 301. The MR creation unit 305 acquires the handover requirements specified by the received Measurement Control, such as the signal strength threshold, for example. The MR creation unit 305 regularly receives the measurement results of signal strength from the signal strength measurement unit 302. When the received measurement results of signal strength satisfy the handover requirements, the MR creation unit 305 creates Measurement Report. The MR creation unit 305 then transmits the created Measurement Report to the data transmitter and receiver unit 301.

Figure 9A:
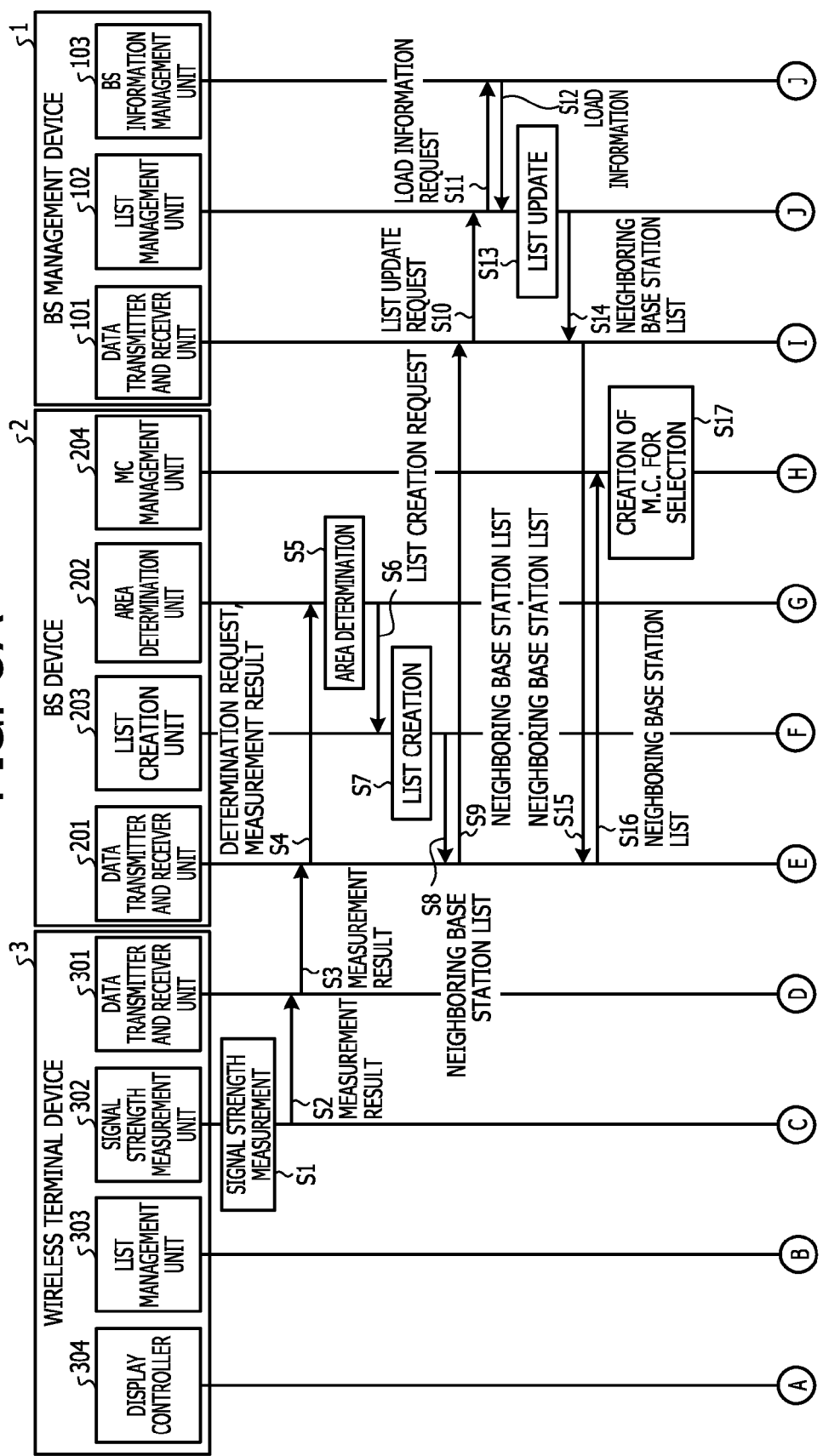

Next, with reference to FIGS. 9A and 9B, a description is given of an entire flow of the process to provide the target base station selection screen in the wireless access system according to Embodiment 1. FIGS. 9A and 9B are sequence diagrams of the process to provide the target base station selection screen in the wireless access system according to Embodiment 1. The following description is given of the process to select the target BS device when the wireless terminal device 3 is powered on. The base station device 2 which performs communication for handover is the base station device 2 selected as the temporary serving base station.

When the wireless terminal device 3 is powered on, the signal strength measurement unit 302 measures the signal strength of neighboring base station devices (step S1). The signal strength measurement unit 302 transmits the measurement results of signal strength to the data transmitter and receiver unit 301 (step S2).

The data transmitter and receiver unit 301 transmits the measurement results of signal strength to the data transmitter and receiver unit 201 of the base station device 2 (step S3).

The data transmitter and receiver unit 201 transmits the received measurement results of signal strength to the area determination unit 202 together with a determination request (step S4).

The area determination unit 202 determines whether the wireless terminal device 3 is located in the BS selectable area (step S5). The following description assumes that the wireless terminal device 3 is located in the BS selectable area. The area determination unit 202 transmits a list creation request to the list creation unit 203 together with information about the neighboring base station devices (step S6).

Upon receiving the list creation request, the list creation unit 203 creates the neighboring base station list using the information about the neighboring base station devices (step S7). The list creation unit 203 transmits the created neighboring base station list to the data transmitter and receiver unit 201 (step S8). The data transmitter and receiver unit 201 transmits to the data transmitter and receiver unit 101 of the base station management device 1, the neighboring base station list received from the list creation unit 203 (step S9).

Upon receiving the neighboring base station list, the data transmitter and receiver unit 101 transmits the neighboring base station list to the list management unit 102 together with a list update request (step S10).

Upon receiving the list update request, the list management unit 102 requests load information of each of the base station devices 2 described in the neighboring base station list from the base station information management unit 103 (step S11). The base station information management unit 103 transmits to the list management unit 102, the load information, that is, the number of users and downlink data volume, of each specified base station device 2 (step S12).

The list management unit 102 calculates the downlink space volume from the downlink data volume acquired from the base station information management unit 103. The list management unit 102 registers the number of users and downlink space volume to update the neighboring base station list (step S13).

The list management unit 102 transmits the updated neighboring base station list to the data transmitter and receiver unit 101 (step S14). The data transmitter and receiver unit 101 transmits the received neighboring base station list to the data transmitter and receiver unit 201 of the base station device 2 (step S15).

The data transmitter and receiver unit 201 transmits the received neighboring base station list to the MC management unit 204 together with a Measurement Control creation request (step S16). The MC management unit 204 creates Measurement Control for selection including information of the neighboring base station list (step S17).

The MC management unit 204 transmits the created Measurement Control (M.C. in FIG. 9A) to the data transmitter and receiver unit 201 (step S18). The data transmitter and receiver unit 201 transmits the received Measurement Control to the data transmitter and receiver unit 301 of the wireless terminal device 3 (step S19).

The data transmitter and receiver unit 301 transmits the received Measurement Control to the list management unit 303 together with a list update request (step S20). Upon receiving the list update request, the list management unit 303 transmits a request to measure the signal strength of the base station devices 2 registered in the received Measurement Control to the signal strength measurement unit 302 (step S21).

Upon receiving the request to measure the signal strength, the signal strength measurement unit 302 measures the signal strength of the specified base station devices 2 (step S22). The signal strength measurement unit 302 then transmits the measurement results of signal strength to the list management unit 303 (step S23).

Upon receiving the measurement results of signal strength, the list management unit 303 updates the information of the signal strength of each base station device 2 registered in the Measurement Control with the new measurement results (step S24). Next, the list management unit 303 transmits to the display controller 304, the Cell PCI, signal strength, number of users, and downlink space volume of each base station device 2 registered in the Measurement Control (step S25). The selection screen information in FIG. 9B corresponds to the Cell PCI, signal strength, number of users, and downlink space volume of each base station device 2.

The display controller 304 creates the base station selection screen using the Cell PCI, signal strength, number of users, and downlink space volume of each base station device 2. The display controller 304 displays the created base station selection screen on the display unit 306 to provide the same for the subscriber (step S26). The display controller 304 receives an input of the selected base station device 2 by the subscriber (step S27).

Figure 10:
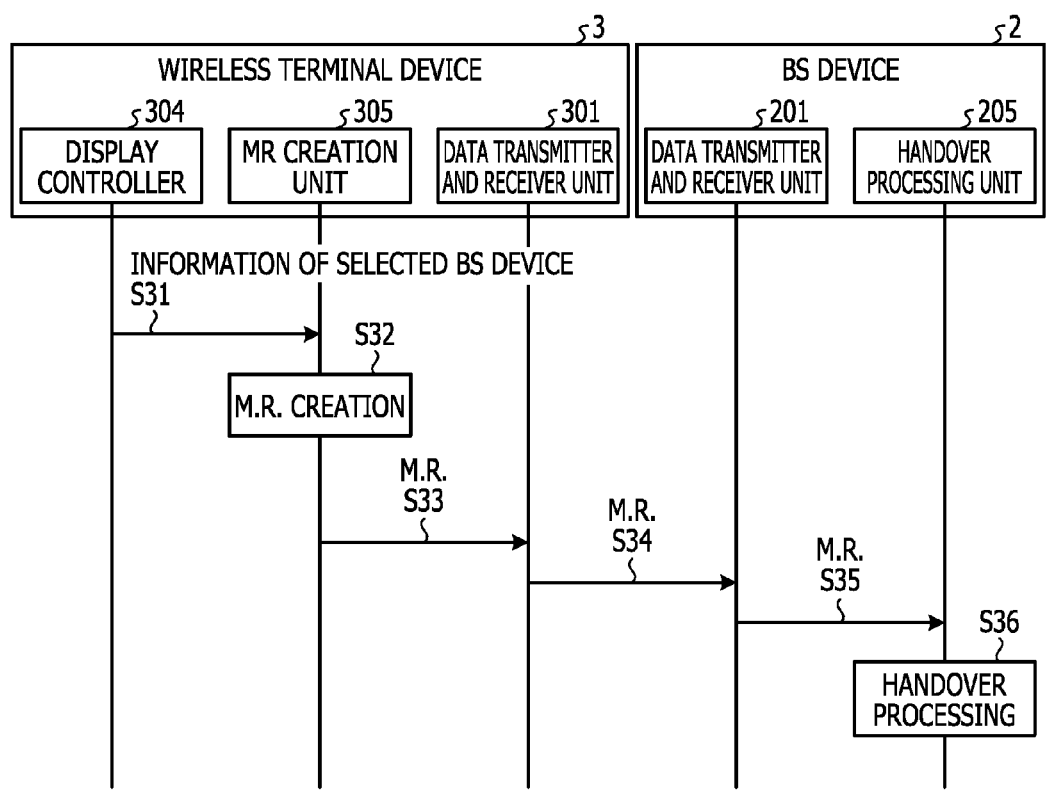
FIG. 10 is a sequence diagram of a process to change the serving BS device after base station selection.

Next, with reference to FIG. 10, a description is given of the flow of the process to change the serving BS device after selection of the target BS device by the subscriber. FIG. 10 is a sequence diagram of the process to change the serving BS device after the target selection by the subscriber.

The display controller 304 of the wireless terminal device 3 transmits the information of the selected base station device to the MR creation unit 305 (step S31).

The MR creation unit 305 creates Measurement Report (indicated by M.R. in FIG. 10) including the information of the selected base station device (step S32). The MR creation unit 305 transmits the created Measurement Report to the data transmitter and receiver unit 301 (step S33).

The data transmitter and receiver unit 301 transmits the received Measurement Report to the data transmitter and receiver unit 201 of the base station device 2 (step S34).

The data transmitter and receiver unit 201 transmits the received Measurement Report to the handover processing unit 205 (step S35). The handover processing unit 205 executes a handover process to change the serving BS device of the wireless terminal device 3 to the selected base station device specified by the Measurement Report (step S36).

Figure 11:
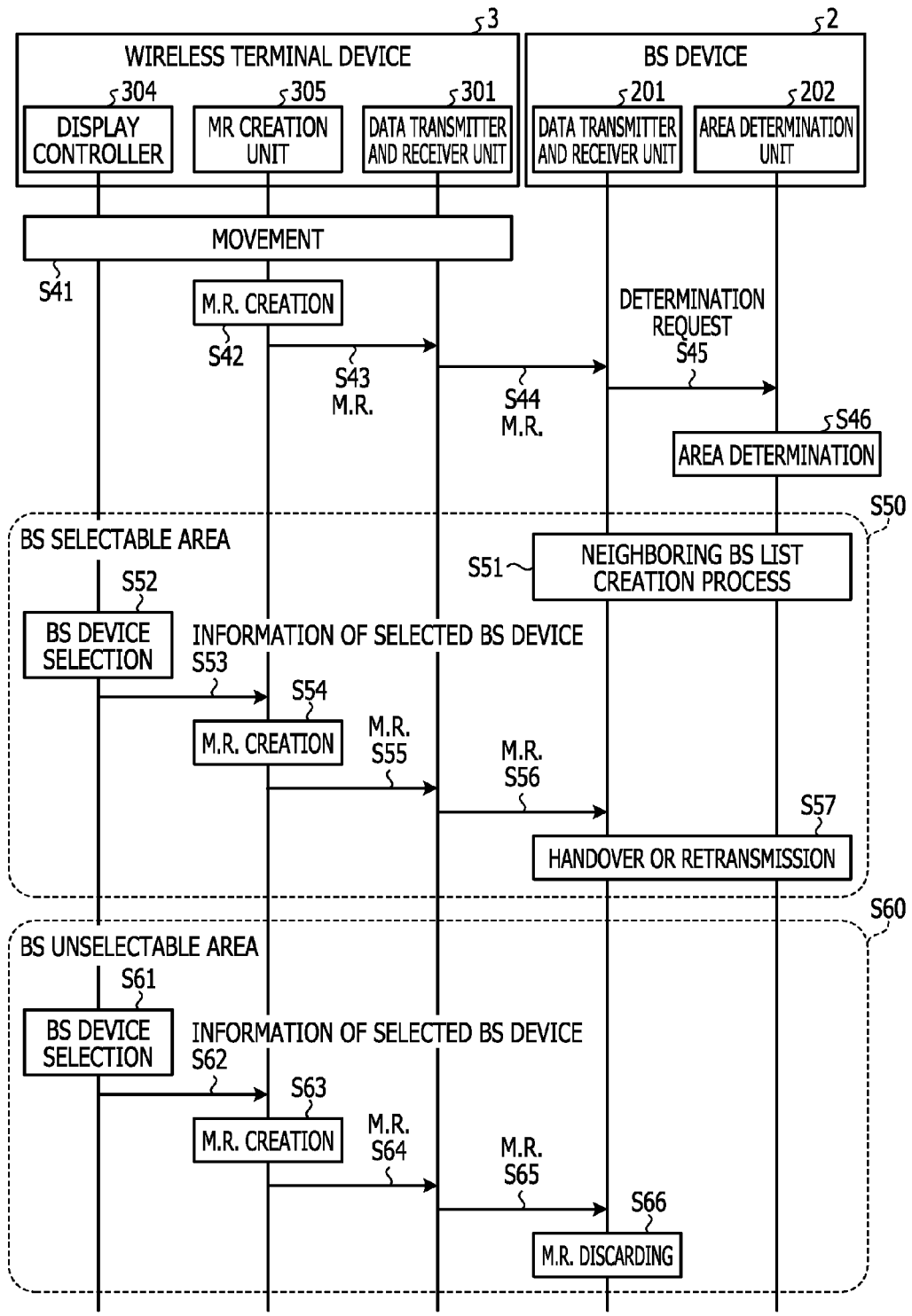
FIG. 11 is a sequence diagram of a process when Measurement Report is transmitted during selection of the target BS device.

Next, with reference to FIG. 11, a description is given of the flow of the process performed in the case where the Measurement Report is transmitted from the wireless terminal device 3 during selection of the target BS device by the subscriber. FIG. 11 is a sequence diagram of the process when the measurement report is transmitted during selection of the target BS device by the subscriber. The following description assumes that the wireless terminal device 3 creates Measurement Report based on Measurement Control and transmits the same. Herein, the base station selection screen is already displayed on the display unit 306.

The wireless terminal device 3 moves between cells to satisfy the handover requirements (step S41). The MR creation unit 305 creates Measurement Report (step S42). The MR creation unit 305 transmits the created Measurement Report to the data transmitter and receiver unit 301 (step S43). The data transmitter and receiver unit 301 transmits the received Measurement Report to the data transmitter and receiver unit 201 of the base station device 2 (step S44).

Upon receiving the Measurement Report, the data transmitter and receiver unit 201 transmits to the area determination unit 202, a request to determine the area where the wireless terminal device 3 is located (step S45). The area determination unit 202 performs area determination whether the area where the wireless terminal device 3 is located is the BS selectable area (step S46). When the area where the wireless terminal device 3 is located is the BS selectable area, the process goes to step S50, which is the processing procedure for the case where the wireless terminal device 3 is located in the BS selectable area. When the area where the wireless terminal device 3 is located is the BS unselectable area, the process goes to step S60, which is the processing procedure for the case where the wireless terminal device 3 is located in the BS unselectable area. The steps S50 and S60 are described in detail below.

First, the step S50 is described. The base station device 2 executes a process to create the neighboring base station list (step S51).

Upon the subscriber's target selection, the display controller 304 acquires information about the selected base station device (step S52). The display controller 304 transmits the information about the selected base station device to the MR creation unit 305 (step S53). The MR creation unit 305 crates Measurement Report including the information about the selected base station device (step S54). The MR creation unit 305 transmits the created Measurement Report to the data transmitter and receiver unit 301 (step S55). The data transmitter and receiver unit 301 transmits the received Measurement Report to the transmitter and receiver unit 201 of the base station device 2 (step S56).

The data transmitter and receiver unit 201 receives the Measurement Report including the information about the selected base station device. If a new neighboring base station list is already created, the data transmitter and receiver unit 201 discards the received Measurement Report and again transmits Measurement Control including information about the new created neighboring base station list. When any new neighboring base station list is not created yet, the data transmitter and receiver unit 201 transmits the received Measurement Report to the handover processing unit 205 to cause the handover processing unit 205 to execute the handover process to change the serving BS device 2 (step S57).

Next, the step S60 is described. In this case, the wireless terminal device 3 is located in the BS unselectable area, and the base station device 2 therefore does not create the neighboring base station list.

Upon the subscriber's selection of the target BS device, the display controller 304 acquires information about the selected base station device (step S61). The display controller 304 transmits the information about the selected base station device to the MR creation unit 305 (step S62). The MR creation unit 305 creates Measurement Report including the information about the selected base station device (step S63). The MR creation unit 305 transmits the created Measurement Report to the data transmitter and receiver unit 301 (step S64). The data transmitter and receiver unit 301 transmits the received Measurement Report to the data transmitter and receiver unit 201 of the base station device 2 (step S65).

In this case, the wireless terminal device 3 is located in the BS unselectable area and is not allowed to perform selection of the target BS device. The data transmitter and receiver unit 201 therefore discards the received Measurement Report (step S66).

Figure 12:
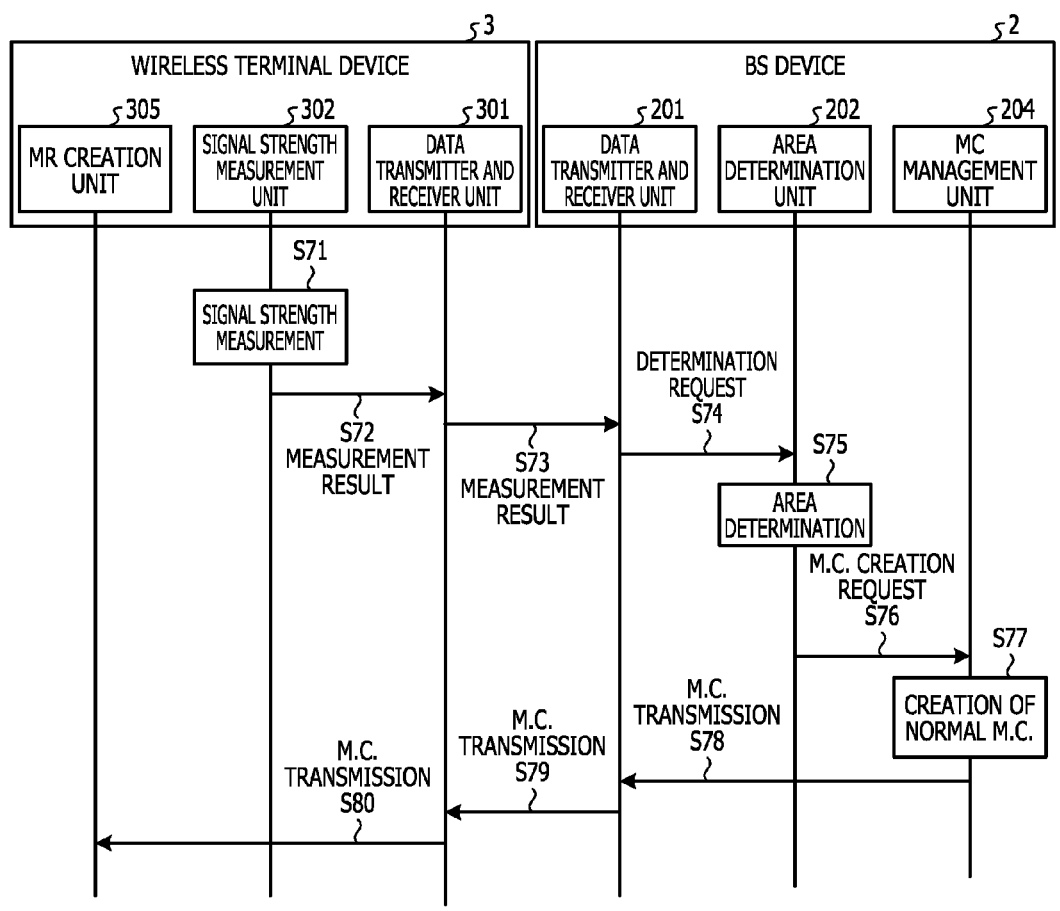
FIG. 12 is a sequence diagram of a process of the wireless access system when the wireless terminal device is located in the BS unselectable area.

With reference to FIG. 12, a description is given of the flow of the process of the wireless access system when the wireless terminal device 3 is located in the BS unselectable area. FIG. 12 is a sequence diagram of the process of the wireless access system when the wireless terminal device 3 is located in the BS unselectable area. The following description is also given of the case where the wireless terminal device 3 is powered on by way of example.

When the wireless terminal device 3 is powered on, the signal strength measurement unit 302 measures strength of the signal transmitted from the neighboring base station devices (step S71). The signal strength measurement unit 302 transmits the measurement results of signal strength to the data transmitter and receiver unit 301 (step S72). The data transmitter and receiver unit 301 transmits the measurement results of signal strength to the data transmitter and receiver unit 201 of the base station device 2 (step S73). The data transmitter and receiver unit 201 transmits the measurement results of signal strength to the area determination unit 202 together with a determination request (step S74).

The area determination unit 202 determines whether the wireless terminal device 3 is located in the BS selectable area (step S75). Herein, the wireless terminal device 3 is located in the BS selectable area. The area determination unit 202 then transmits a Measurement Control creation request to the MC management unit 204 (step S76).

Upon receiving the Measurement Control creation request, the MC management unit 204 creates normal Measurement Control (step S77). The MC management unit 204 transmits the created Measurement Control to the data transmitter and receiver unit 201 (step S78). The data transmitter and receiver unit 201 transmits the received Measurement Control to the data transmitter and receiver unit 301 of the wireless terminal device 3 (step S79).

The data transmitter and receiver unit 301 transmits the received Measurement Control to the MR creation unit 305 (step S80). Thereafter, based on the measurement results of signal strength received from the signal strength measurement unit 302, the MR creation unit 305 then determines whether the measurement results of signal strength satisfy the handover requirements specified by the Measurement Control. When the handover requirements are satisfied, the MR creation unit 305 transmits Measurement Report to the data transmitter and receiver unit 301.

Figure 13:
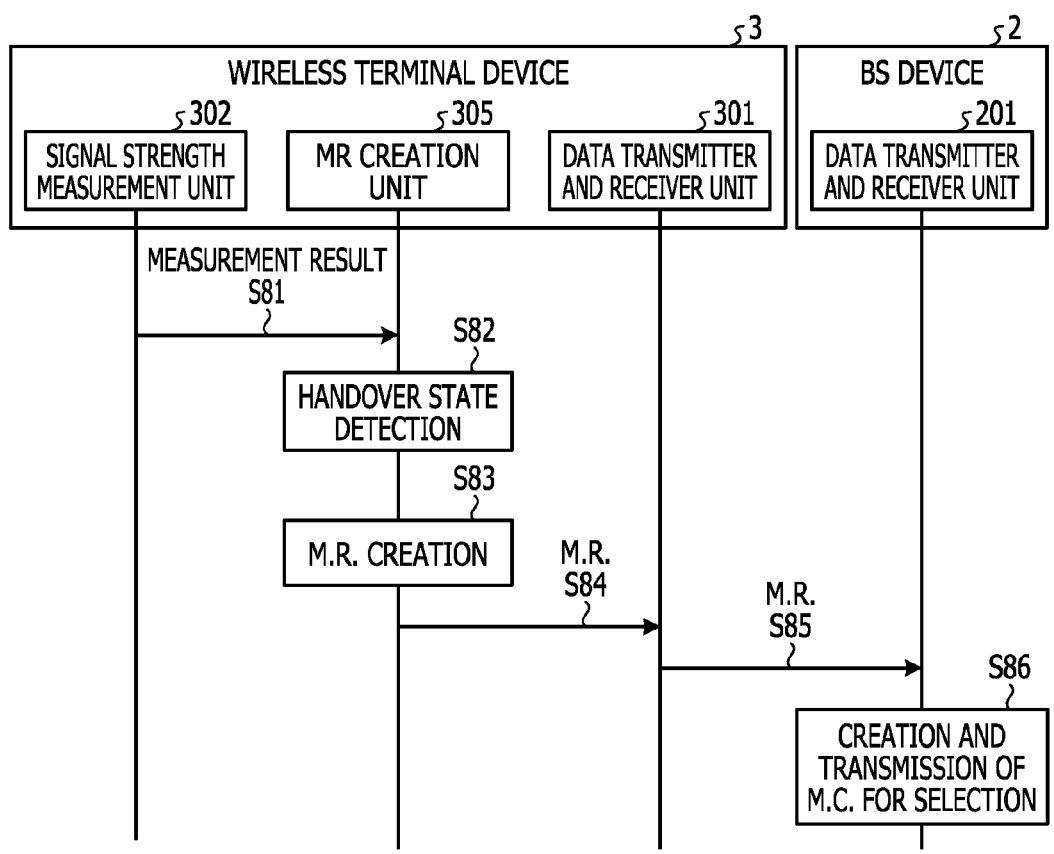
FIG. 13 is a sequence diagram of a process to transmit Measurement Report when the handover requirements are satisfied.

Next, a description is given of the flow of the process until the Measurement Control for selection is created and transmitted in the cases other than the case where the wireless terminal device 3 is powered on. With reference to FIG. 13, first, a description is given of the flow of the process to transmit Measurement Report when the handover requirements specified by the Measurement Control are satisfied. FIG. 13 is a sequence diagram of the process to transmit the Measurement Report when the handover requirements are satisfied.

The signal strength measurement unit 302 measures the signal strength of the neighboring base station devices. The signal strength measurement unit 302 transmits the measurement results of signal strength of the neighboring base station devices to the MR creation unit 305 (step S81).

Based on the measurement results of signal strength received from the signal strength measurement unit 302, the MR creation unit 305 determines whether the measured signal strength satisfies the handover requirements to detect a handover state (step S82). When detecting the handover state, the MR creation unit 305 creates Measurement Report (step S83).

The MR creation unit 305 transmits the Measurement Report to the data transmitter and receiver unit 301 (step S84). The data transmitter and receiver unit 301 transmits the received Measurement Report to the data transmitter and receiver unit 201 of the base station device 2 (step S85).

The base station device 2 then performs the process to create and transmit the Measurement Control for selection, which are illustrated in step S4 and subsequent steps of FIG. 9A, for example (step S86).

Figure 14:
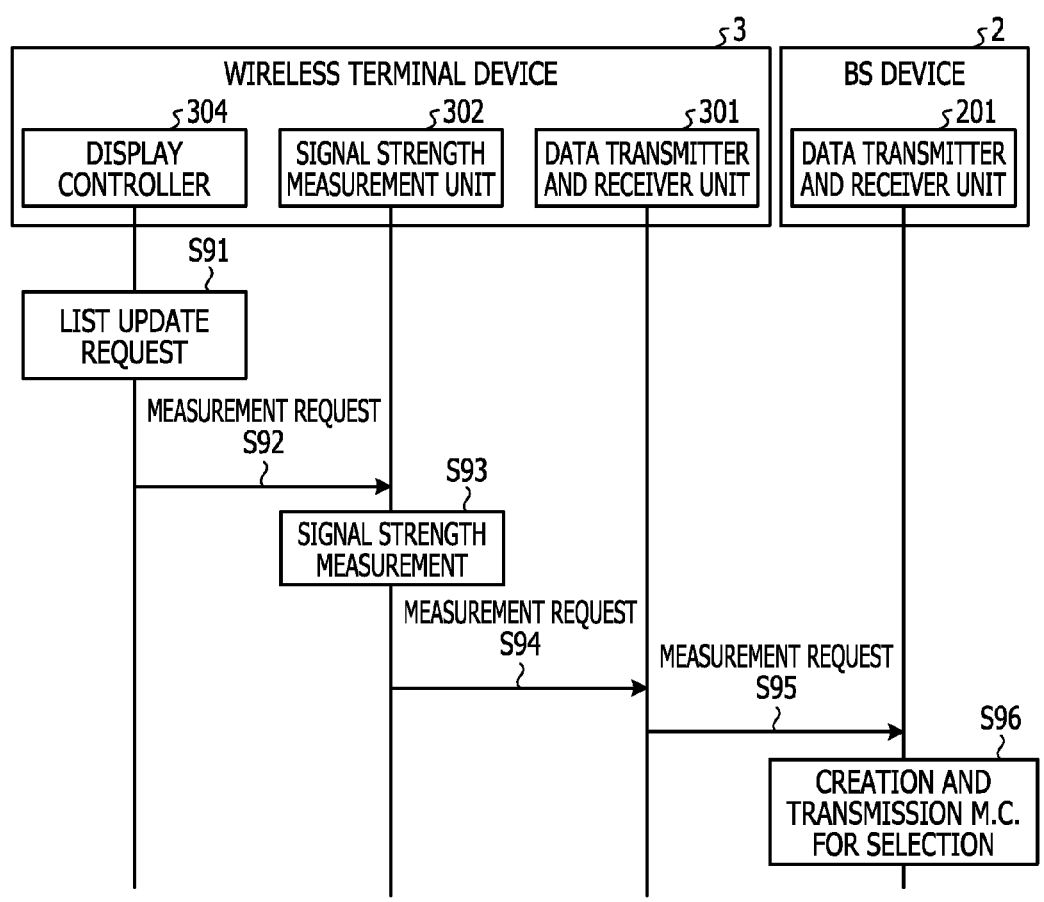
FIG. 14 is a sequence diagram of a measurement result notification process when a list update request is received from a user.

Next, with reference to FIG. 14, a description is given of the flow of a measurement result notification process when a list update request is received from the subscriber. FIG. 14 is a sequence diagram of the measurement result notification process when a list update request is received from the subscriber.

The display controller 304 receives the list update request from the subscriber (step S91). Upon receiving the list update request, the display controller 304 transmits to the signal strength measurement unit 302, a request to measure the signal strength of the neighboring base station devices (step S92).

Upon receiving the request to measure the signal strength of the neighboring base station device, the signal strength measurement unit 302 measures the signal strength of the neighboring base station devices (step S93). The signal strength measurement unit 302 transmits the measurement results of signal strength of the neighboring base station devices to the data transmitter and receiver unit 301 (step S94). The data transmitter and receiver unit 301 transmits the received measurements to the data transmitter and receiver unit 201 of the base station device 2 (steps S95).

The base station device 2 performs the process to create and transmit Measurement Control for selection, which is illustrated in step S4 and subsequent steps in FIG. 9, for example (step S96).

Figure 15:
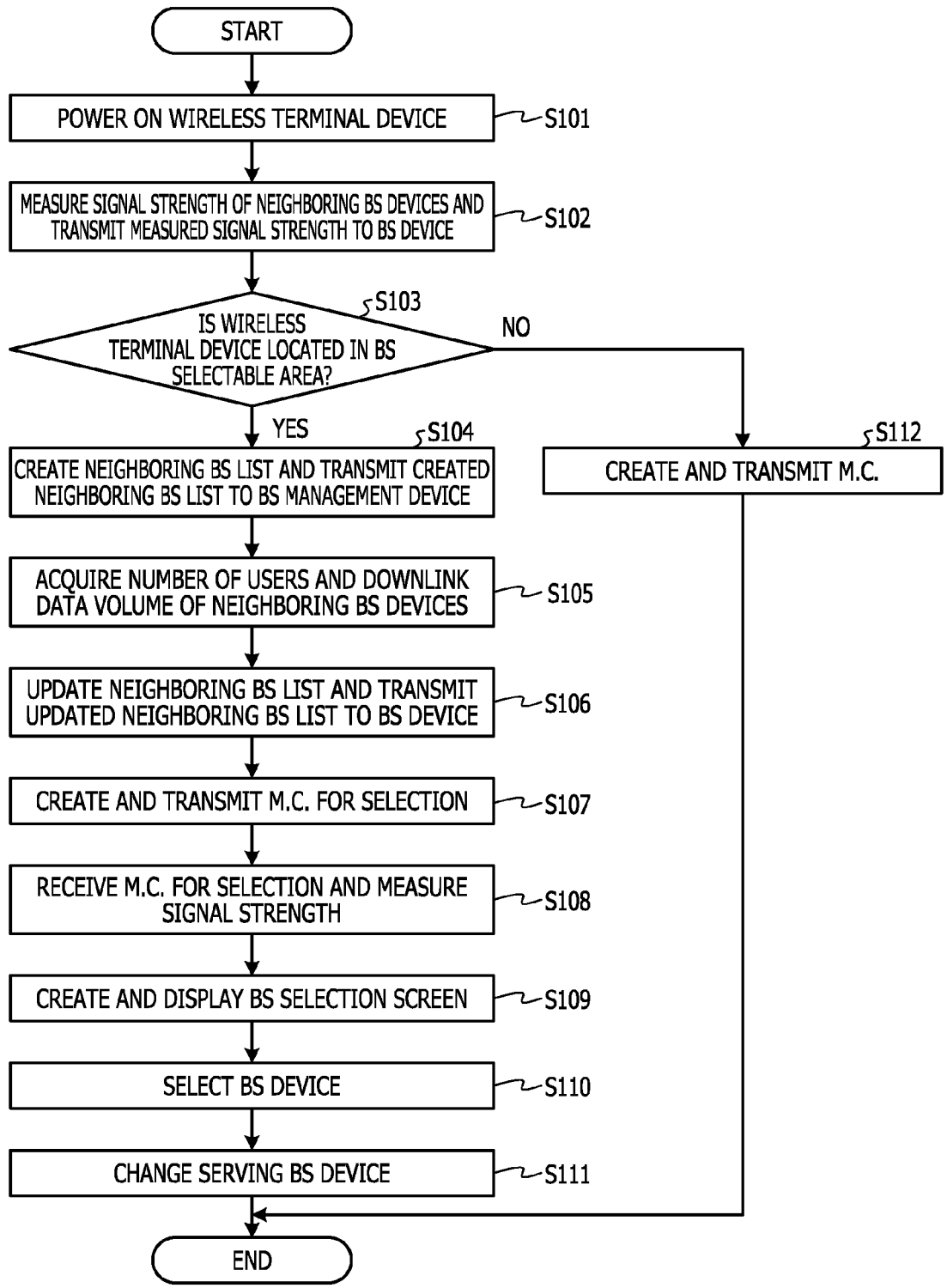
FIG. 15 is a flowchart of changing the serving BS device by selection in the wireless access system according to Embodiment 1.

With reference to FIG. 15, a description is given of changing the serving BS device by selection in the wireless access system according to Embodiment 1. FIG. 15 is a flowchart to change the serving BS device by selection in the wireless access system according to Embodiment 1. Herein, the description is given of the case where the wireless terminal device 3 is powered on by way of example.

The wireless terminal device 3 is powered on by the subscriber (step S101).

The signal strength measurement unit 302 measures the signal strength of the neighboring base station devices. The data transmitter and receiver unit 301 transmits the measurements of the signal strength of the neighboring base station devices to the base station device 2 (step S102).

The data transmitter and receiver unit 201 receives the measurement results of signal strength of the neighboring base station devices from the data transmitter and receiver unit 301 and transmits the same to the area determination unit 202. The area determination unit 202 uses the measured signal strength of the neighboring base station devices to determine whether the wireless terminal device 3 is located in the BS selectable area (step S103).

When the wireless terminal device 3 is located in the BS selectable area (step S103: YES), the list creation unit 203 creates the neighboring base station list. The data transmitter and receiver unit 201 transmits the neighboring base station list created by the list creation unit 203 to the base station management device 1 (step S104).

The data transmitter and receiver unit 101 transmits the received neighboring base station list to the list management unit 102. The list management unit 102 acquires the number of users and downlink data volume of each base station device 2 described in the neighboring base station list (step S105).

The list management unit 102 calculates the downlink space volume of each base station device 2 based on the acquired downlink data volume. The list management unit 102 registers the acquired number of users and the calculated downlink space volume in the registration columns corresponding to each base station device 2 in the neighboring base station list to update the neighboring base station list. Thereafter, the data transmitter and receiver unit 101 transmits the neighboring base station list updated by the list management unit 102 to the base station device 2 (step S106).

The data transmitter and receiver unit 201 transmits the updated neighboring base station list to the MC management unit 204 together with a request to create Measurement Control. The MC management unit 204 creates the Measurement Control for selection. The data transmitter and receiver unit 201 transmits the Measurement Control for selection created by the MC management unit 204 to the wireless terminal device 3 (step S107).

The data transmitter and receiver unit 301 receives the Measurement Control for selection. The data transmitter and receiver unit 301 transmits the Measurement Control for selection to the list management unit 303 together with an update request. The list management unit 303 requests measurement of signal strength from the signal strength measurement unit 302. The signal strength measurement unit 302 measures the signal strength of the neighboring base station devices described in the Measurement Control for selection (step S108).

The list management unit 303 receives the measurement results of signal strength of the neighboring base station devices from the signal strength measurement unit 302. The list management unit 303 transmits to the display controller 304, the signal strength of the neighboring base station devices acquired from the received measurements, the number of users, and the downlink space volume. The display controller 304 creates the base station selection screen displaying the signal strength, number of users, and downlink space volume of each neighboring base station device in association with the Cell PCI of the neighboring base station. The display controller 304 then displays the created base station selection screen on the display unit 306 (step S109).

The user uses the base station selection screen displayed on the display unit 306 to select a base station device 2 as the target BS device and input the selected base station device 2 to the display controller 304 (step S110).

The MR creation unit 305 creates Measurement Report including information about the selected base station device. The data transmitter and receiver unit 301 transmits the Measurement Report created by the MR creation unit 305 to the base station device 2. The data transmitter and receiver unit 201 transmits the received Measurement Report to the handover processing unit 205. The handover processing unit 205 executes handover to change the serving BS device to the selected based station device specified in the Measurement Report (step S111).

As described above, in the process of selecting the target BS device when the wireless terminal device is powered on or at handover, the wireless access system according to Embodiment 1 presents the signal strength and load information of the candidate base station devices for the target BS device to the subscriber of the wireless terminal device and prompts the subscriber to select one of the candidate base station devices as the target BS device. The wireless access system according to Embodiment 1 then hands over the wireless terminal device to the base station device selected by the subscriber. Accordingly, the wireless access system of Embodiment 1 selects the target BS device in consideration of the load instead of typically selecting the base station device that has the highest signal strength and provides the best communication. This can increase the QoE for the wireless services.

The wireless access system of Embodiment 1 transmits the information used in the selection of the target BS device from the neighboring base station devices to the wireless terminal device by using Measurement Control and is unnecessary to define new signal. Accordingly, the wireless access system of Embodiment 1 provides the information used in the selection of the target BS device with a small modification for the conventional wireless access systems. The QoE is therefore easily improved.

Embodiment 2

Figure 16:
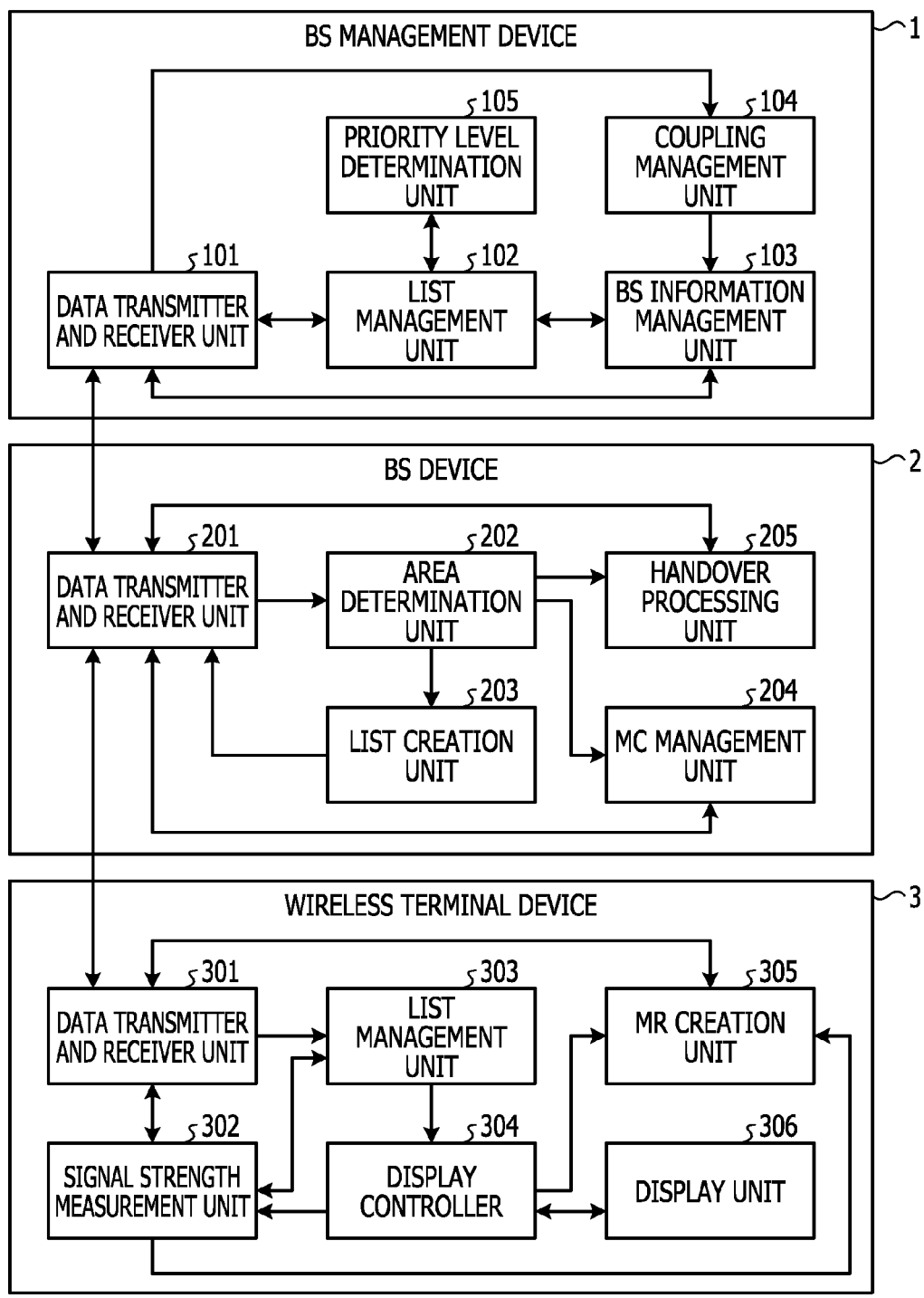
FIG. 16 is a block diagram of a wireless access system according to Embodiment 2.

FIG. 16 is a block diagram of a wireless access system according to Embodiment 2. The wireless access system according to Embodiment 2 differs from that of Embodiment 1 in determining priority levels and additionally provides information about the priority levels for the subscriber to prompt the subscriber to select the target BS device. As illustrated in FIG. 16, the base station management device 1 according to Embodiment 2 includes a priority level determination unit 105 in addition to the components of Embodiment 1. The same components as those of Embodiment 1 are not described in the following description.

The list creation unit 203 of the base station device 2 creates a neighboring base station list 411 illustrated in FIG. 17A. FIGS. 17A and 17B are tables illustrating examples of the neighboring base station list according to Embodiment 2. In Embodiment 2, the list creation unit 203 creates the neighboring base station list 411 including registration fields for priority levels in association with the Cell PCIs of the neighboring base station devices. The list creation unit 203 transmits the neighboring base station list 411 to the base station management device 1 through the data transmitter and receiver unit 201.

The list management unit 102 receives the neighboring base station list 411 from the data transmitter and receiver unit 101 together with a list update request. The list management unit 102 acquires the number of users and downlink data volume of each neighboring base station device from the base station information management unit 103. The list management unit 102 calculates the downlink space volume from the downlink data volume.

Next, the list management unit 102 transmits the number of users and downlink space volume of each neighboring base station device to the priority level determination unit 105. Thereafter, the list management unit 102 acquires the priority levels of the neighboring base station devices from the priority level determination unit 105.

The list management unit 102 registers and updates the number of users, downlink space volume, and the level of priority of each neighboring base station device in association with the Cell PCI thereof in the neighboring base station list 411 to create a neighboring base station list 412. The list management unit 102 then transmits the created neighboring base station list 412 to the data transmitter and receiver unit 101.

The priority level determination unit 105 receives the number of users and downlink space volume of each neighboring base station device from the list management unit 102. The priority level determination unit 105 divides the downlink space volume by the number of users. The priority level determination unit 105 prioritizes the neighboring base station devices in a descending order of the obtained quotients. Herein, by dividing the downlink space volume by the number of users, the priority level determination unit 105 calculates an approximate downlink data volume available for the wireless terminal device 3. In other words, the priority level determination unit 105 determines the priority level of each base station device 2 by using an approximate throughput when the wireless terminal device 3 is coupled to the base station device 2.

The method of deciding the priority levels is described for the case where the number of users and downlink space volume of each neighboring base station device have values illustrated in the neighboring base station list 412 of FIG. 17B. For the base station device 2 with a Cell PCI of AAA, the division of the downlink space volume by the number of users results in 50,000,000. For the base station device 2 having a Cell PCI of BBB, the division of the downlink space volume by the number of users results in 20,000. For the base station device 2 having a Cell PCI of CCC, the division of the downlink space volume by the number of users results in 500,000,000. The priority level determination unit 105 therefore assigns the highest priority level to the base station device 2 with a Cell PCI of CCC that has the largest quotient. The priority level determination unit 105 assigns the second highest priority level to the base station device 2 with a Cell PCI of AAA that has the second largest quotient and gives the lowest priority level to the base station device 2 to a Cell PCI of BBB that has the smallest quotient.

The priority level determination unit 105 notifies the list management unit 102 of the priority levels assigned to the respective neighboring base station devices.

The list management unit 303 of the wireless terminal device 3 receives the Measurement Control for selection storing the information of the neighboring base station list 412 from the data transmitter and receiver unit 301. Next, the list management unit 303 acquires from the signal strength measurement unit 302, the latest signal strengths of the neighboring base station devices specified in the Measurement Control for selection. The list management unit 303 transmits to the display controller 304, the Cell PCI, signal strength, number of users, downlink space volume, and priority level of each neighboring base station device.

The display controller 304 receives the Cell PCI, signal strength, number of users, downlink space volume, and priority level of each neighboring base station device from the list management unit 303. The display controller 304 registers the received information in a previously determined format to create a base station selection screen 413 illustrated in FIG. 18. FIG. 18 is a diagram illustrating an example of the base station selection screen according to Embodiment 2.

The display controller 304 displays the created base station selection screen 413 on the display unit 306 to provide the same to the subscriber. The user refers to the base station selection screen 413 displayed on the display unit 306 to select the target BS device based on the signal strength, number of users, downlink space volume, and priority level of each of the neighboring base station devices which are candidates for the target BS device.

As described above, the wireless access system according to Embodiment 2 provides the subscriber with information of candidate base station devices for the target BS device with the priority levels assigned in a descending order of the throughput. Accordingly, the subscriber easily sees which base station device is more preferable in terms of throughput without determining the conditions of each base station device based on the number of users and downlink data volume by himself/herself. The user therefore easily selects a preferable base station device capable of providing a good balance between the QoE and communication conditions as the target BS device.

In Embodiment 2, the calculated priority levels are provided for the subscriber to prompt the subscriber to select the target BS device. However, the wireless access system may be configured to automatically execute handover of the wireless terminal device 3 to a base station device of the highest priority level among the neighboring base station devices with communication strengths higher than a predetermined value.

In the aforementioned embodiments, the subscriber selects the target BS device by using the downlink data volume. However, the wireless access system may be configured to monitor uplink data volume and provide the uplink data volume to the subscriber as the information for use in the selection in a similar manner.

In the above description, the functions of the base station management device are installed in the device different from the base station devices. However, the provision of the base station management device 1 is not limited to such a configuration. For example, the functions of the base station management device may be installed in a base station device, or the base station management device may be independently provided on a network.

(Hardware Configuration)

Figure 19:
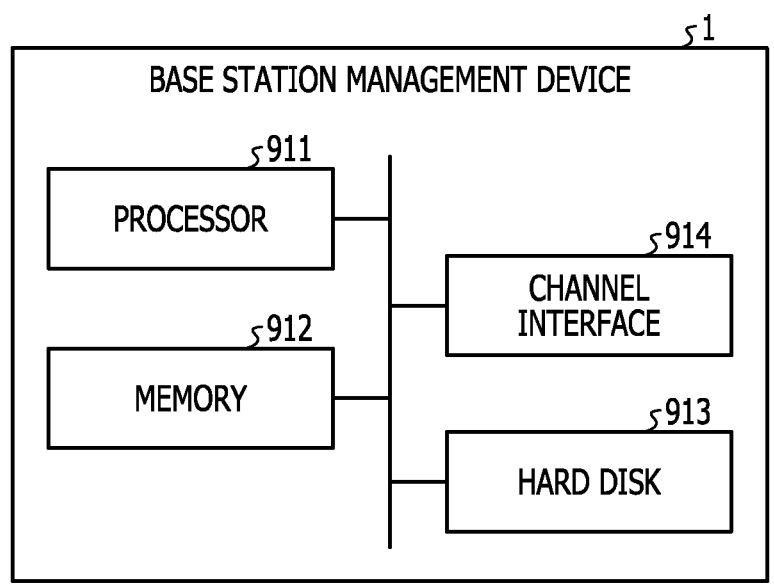
FIG. 19 is a hardware block diagram of the base station management device.
Figure 20:
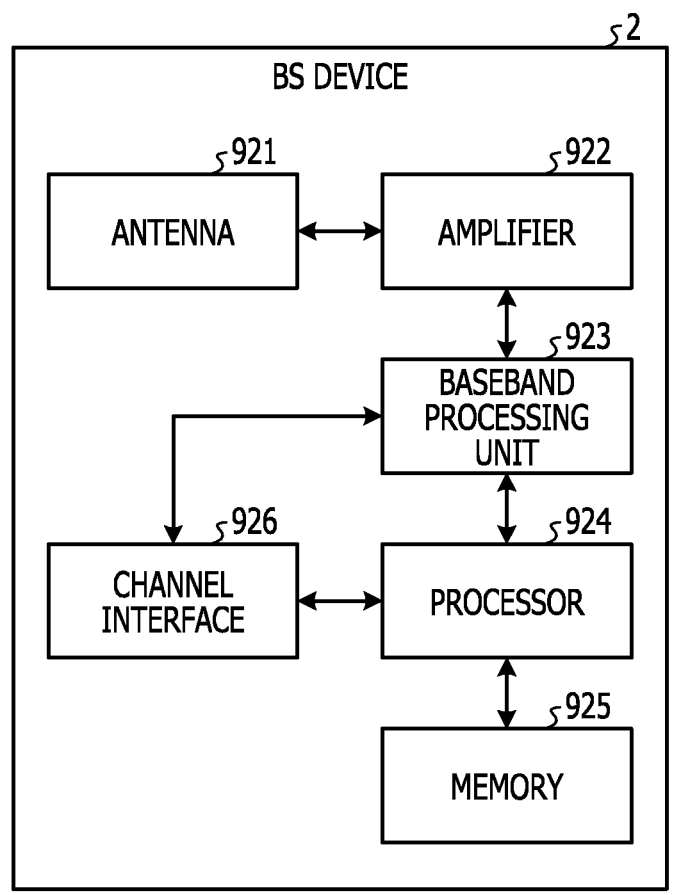
FIG. 20 is a hardware block diagram of a base station device.
Figure 21:
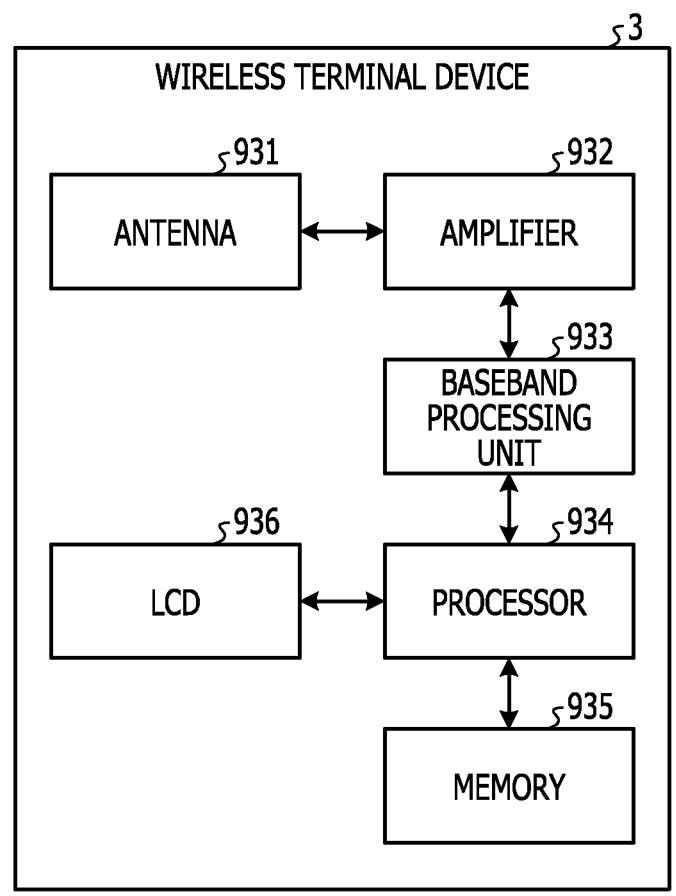
FIG. 21 is a hardware block diagram of a wireless terminal device.

Next, a description is given of the hardware configurations of the base station management device 1, base station device 2, and wireless terminal device 3 with reference to FIGS. 19 to 21. FIGS. 19 to 21 are hardware block diagrams of the base station management device, base station device, and wireless terminal device, respectively.

In FIG. 19, the base station management device 1 is provided on the network independently. To provide the functions of the base station management device 1 for other devices such as the SGW 12 of FIG. 1, for example, the functions of the base station management device 1 are implemented using resources corresponding to the units illustrated in FIG. 19.

As illustrated in FIG. 19, the base station management device 1 includes a processor 911, a memory 912, a hard disk 913, and a channel interface 914.

The memory 912, hard disk 913, and channel interface 914 are coupled to the processor 911 through a bus.

The channel interface 914 is an interface for communication with the base station device 2, for example.

The hard disk 913 stores various programs including programs implementing the functions of the data transmitter and receiver unit 101, list management unit 102, base station information management unit 103, coupling management unit 104, and priority level determination unit 105, which are illustrated in FIGS. 2 and 16 by way of example. The hard disk 913 further stores various information included by the base station management unit 103.

The processor 911 loads the various programs stored in the hard disk 913 into the memory 912. The processor 911 uses the hard disk 913 and channel interface 914 to execute the programs loaded in the memory 912. The processor 911 thereby implements the functions of the data transmitter and receiver unit 101, list management unit 102, base station information management unit 103, coupling management unit 104, and priority level determination unit 105.

As illustrated in FIG. 20, the base station device 2 includes an antenna 921, an amplifier 922, a baseband processing unit 923, a processor 924, a memory 925, and a channel interface 926.

The antenna 921 is an antenna for communication with the wireless terminal device 3 by radio. The channel interface 926 is an interface for communication with the base station management device 1.

The baseband processing unit 923 performs baseband processing for data exchanged in communication between wireless terminal devices 3, for example. The baseband processing unit 923 performs the baseband processing for signals transmitted from the processor 924.

The amplifier 922 amplifies signals outputted from the baseband processing unit 923. The amplified signals are transmitted to the wireless terminal device 3 through the antenna 921.

The memory 925 includes various programs including programs implementing the functions of the data transmitter and receiver unit 201, area determination unit 202, list creation unit 203, MC management unit 204, and handover processing unit 205, which are illustrated in FIGS. 2 and 16 by way of example.

The processor 924 reads and executes the various programs stored in the memory 925 to implement the functions of the data transmitter and receiver unit 201, area determination unit 202, list creation unit 203, MC management unit 204, and handover processing unit 205.

As illustrated in FIG. 21, the wireless terminal device 3 includes an antenna 931, an amplifier 932, a baseband processing unit 933, a processor 934, a memory 935, and a liquid crystal display (LCD) 936.

The antenna 931 is an antenna for communication with the base station device 2 by radio. The LCD 936 implements the function of the display unit 306, which is illustrated in FIGS. 2 and 16 by way of example, for example.

The baseband processing unit 933 performs baseband processing for data exchanged in communication with the base station device 2, for example. The baseband processing unit 933 performs baseband processing for signals outputted from the processor 934.

The amplifier 932 amplifies signals outputted from the baseband processing unit 933. The amplified signals are transmitted to the base station device 2 through the antenna 931.

The memory 935 includes various programs including programs implementing the functions of the data transmitter and receiver unit 301, signal strength measurement unit 302, list management unit 303, display controller 304, and MR creation unit 305, which are illustrated in FIGS. 2 and 16 by way of example.

The processor 924 reads and executes the various programs stored in the memory 925 to implement the functions of the data transmitter and receiver unit 301, signal strength measurement unit 302, list management unit 303, display controller 304, and MR creation unit 305.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication system comprising:
   a first base station device; and
   a first wireless terminal device, wherein
   the first base station device includes:
      a first memory; and
      a first processor coupled to the first memory and configured to:
         acquire identification information of a plurality of base station devices including the first base station device, which are capable of communicating with the first wireless terminal device;
         acquire communication load of each of the plurality of base station devices;
         calculate a throughput of each of the plurality of base station devices using the communication load;
         assign priority levels to the plurality of base station devices based on the calculated throughputs;
         transmit the priority levels and the identification information of each of the plurality of base station devices to the first wireless terminal device; and
         change a serving base station device of the first wireless terminal device to a second base station device which is selected from the plurality of base station devices and which the first base station device is notified of by the first wireless terminal device; and
   the first wireless terminal device includes:
      a second memory; and
      a second processor coupled to the second memory and configured to notify the first base station device of the identification information of the second base station device selected from the plurality of base station devices based on the priority levels and the identification information.

2. The wireless communication system according to claim 1, wherein
   the first wireless terminal device includes a display device, and
   the second processor is configured to
      measure a signal strength of each of signals between the first wireless terminal device and the plurality of base station devices;
      display the strength of the signals, the priority levels, and the identification information of each of the plurality of base station devices on the display device; and
      notify the first base station device of the identification information of the second base station device selected by an operator from the plurality of base station devices displayed on the display device.

3. The wireless communication system according to claim 2, wherein
   the first processor is configured to:
      receive measurement results of the strength of the signals from the first wireless terminal device; and
      acquire the identification information of the plurality of base station devices based on the measurement results.

4. The wireless communication system according to claim 2, wherein
   the first processor is configured to:
      determine, based on the signal strength of the signals, whether the first wireless terminal device is located in a base-station-selectable area where two or more of the plurality of base station devices are available as candidates for the serving base station device of the first wireless terminal device; and
      acquire the communication load when the first wireless terminal device is located in the base-station-selectable area.

5. The wireless communication system according to claim 2, wherein
   the second processor is configured to:
      transmit, at a certain interval, the strength of the signals to the first base station device; and
      continue to transmit the signal strength of the signals for a certain period until receiving a selection decision of the operator, after displaying the signal strength, the priority levels, and the identification information of each of the plurality of base station devices on the display device.

6. The wireless communication system according to claim 5, wherein
   the second processor is configured to:

start counting the certain period from a time of displaying the strength of the signals, the priority levels, and the identification information of each of the plurality of base station devices on the display device; and continue to transmit the measurement results until the counting is completed.

7. The wireless communication system according to claim 1, further comprising:

a plurality of wireless terminal devices including the first wireless terminal device;

wherein the first processor is configured to acquire, as the communication load, the number and communication data volume of the plurality of wireless terminal devices located in a cell of each of the plurality of base station devices.

8. A wireless communication system comprising:

a first base station device;

a first wireless terminal device; and a base station management device, wherein the first base station device includes:

a first memory; and a first processor coupled to the first memory and configured to:

when the first wireless terminal device selects a second base station as a serving base station device, acquire identification information of a plurality of base station devices including the first base station device, which are capable of communicating with the first wireless terminal device;

transmit the identification information of the plurality of base station devices to the base station management device;

receive communication load of each of the plurality of base station devices from the base station management device;

calculate a throughput of each of the plurality of base station devices using the communication load;

assign priority levels to the plurality of base station devices based on the calculated throughputs;

transmit the priority levels and the identification information of each of the plurality of base station devices to the first wireless terminal device; and change the serving base station device of the first wireless terminal device to the second base station device which is selected from the plurality of base station devices and which the first base station device is notified of by the first wireless terminal device;

the base station management device includes:

a second memory; and a second processor coupled to the second memory and configured to notify the first base station device of the identification information of the plurality of base station devices and the communication load of each of the plurality of base station devices; and the first wireless terminal device includes:

a third memory; and a third processor coupled to the third memory and configured to:

receive the priority levels and the identification information of each of the plurality of base station devices; and notify the first base station device of the identification information of the second base station device selected from the plurality of base station devices based on the priority levels and the identification information.

9. A wireless communication method using a wireless communication system including a first base station device and a first wireless terminal device, the method being executed by the first base station device, the method comprising:

acquiring identification information of the plurality of base station devices including the first base station device, which are capable of communicating with the first wireless terminal device;

acquiring communication load of each of the plurality of base station devices by the first base station device;

calculating a throughput of each of the plurality of base station devices using the communication load;

assigning priority levels to the plurality of base station devices based on the calculated throughputs;

transmitting the priority levels and the identification information of each of the plurality of base station devices to the first wireless terminal device by the first base station device;

receiving, from the first wireless terminal device, a notification indicating the identification information of a second base station device selected from the plurality of base station devices based on the priority levels and the identification information; and changing a serving base station device of the first wireless terminal device to the second base station device.

10. The wireless communication method according to claim 9, further comprising:

receiving a notification, from the first wireless terminal device, which indicating the identification information of the second base station device selected by an operator from the plurality of base station devices based on the strength of the signals, the priority levels and identification information.

11. The wireless communication method according to claim 10, further comprising:

receiving measurement results of the strength of the signals from the first wireless terminal device; and acquiring the identification information of the plurality of base station devices based on the measurement results.

12. The wireless communication method according to claim 10, further comprising:

determining based on the measurement results of the strength of the signals, whether the first wireless terminal device is located in a base-station-selectable area where two or more of the plurality of base station devices are available as candidates for the serving base station device of the first wireless terminal device; and acquiring the communication load when the first wireless terminal device is located in the base-station-selectable area.

13. The wireless communication method according to claim 10, further comprising receiving, from the first wireless terminal device, at a certain interval, the measurement results of the strength of the signals; wherein the first wireless terminal device continues to transmit the measurement results for a certain period until receiving a selection decision of the operator, after displaying the signal strength, the priority levels, and the identification information of each of the plurality of base station devices on a display device.

14. The wireless communication method according to claim 13, wherein the first wireless terminal device starts counting the certain period from a time of displaying the strength of the signals, the priority levels, and the identification information of each of the plurality of base station devices on the display device; and the first wireless terminal device continues to transmit the measurement results until the counting is completed.

15. The wireless communication method according to claim 9, wherein the wireless communication system further includes a plurality of wireless terminal devices including the first wireless terminal device, the method further comprising:

acquiring as the communication load, the number and communication data volume of the plurality of wireless terminal devices located in a cell of each of the plurality of base station devices.

16. A first base station comprising:

a memory; and a processor coupled to the memory and configured to:

acquire identification information of a plurality of base station devices including the first base station device, the plurality of base station devices being capable of communicating with a wireless terminal device;

acquire communication load of each of the plurality of base station devices;

calculate a throughput of each of the plurality of base station devices using the communication load;

assign priority levels to the plurality of base station devices based on the calculated throughputs;

transmit, to the wireless terminal device, the priority levels and the identification information of each of the plurality of base station devices;

receive, from the wireless terminal device, a notification indicating the identification information of a second base station device selected from the plurality of base station devices based on the priority levels and the identification information; and change a serving base station device of the wireless terminal device to the second base station device.

17. The first base station according to claim 16, wherein the processor is further configured to:

receive, from the wireless terminal device, measurement results of signal strength of signals which reach the wireless terminal device; and acquire the identification information of the plurality of base station devices based on the measurement results.

18. The first base station according to claim 16, wherein the first processor is further configured to acquire, as the communication load, the number and communication data volume of a plurality of wireless terminal devices including the first wireless terminal device located in a cell of each of the plurality of base station devices.

19. A wireless terminal device comprising:

a memory; and a processor coupled to the memory and configured to:

acquire, from a first base station device, identification information and priority levels of a plurality of base station devices including the first base station device, the priority levels being calculated based on throughputs of the plurality of base station devices, the plurality of base station devices being capable of communicating with the wireless terminal device;

select a second base station device from among the plurality of base station devices based on the priority levels and the identification information; and transmit, to the first base station device, a notification indicating the selected second base station device, wherein the first base station device changes a serving base station device of the wireless terminal device to the second base station device based on the notification.

20. The wireless terminal device according to claim 19, further comprising:

a display device, and wherein the processor is configured to:

measure a signal strength of each of signal between the wireless terminal device and the plurality of base station devices;

display the strength of each of the signals, the priority levels, and the identification information of each of the plurality of base station devices on the display device; and notify the first base station device of the identification information of the second base station device selected by an operator from the plurality of base station devices displayed on the display device.

* * * * *